(12) United States Patent
Metoevi et al.

(10) Patent No.: US 8,411,756 B2
(45) Date of Patent: *Apr. 2, 2013

(54) METHOD AND SYSTEM FOR GENERATING BLOCK MODE CONVERSION TABLE FOR EFFICIENT VIDEO TRANSCODING

(75) Inventors: Isabelle Metoevi, Montreal (CA); Stéphane Coulombe, Brossard (CA)

(73) Assignee: Ecole de Technologie Superieure, Montreal (CA)

( * ) Notice: Subject to any disclaimer, the term of this patent is extended or adjusted under 35 U.S.C. 154(b) by 599 days.

This patent is subject to a terminal disclaimer.

(21) Appl. No.: 12/633,070

(22) Filed: Dec. 8, 2009

(65) Prior Publication Data

US 2010/0296581 A1    Nov. 25, 2010

Related U.S. Application Data

(60) Provisional application No. 61/180,316, filed on May 21, 2009.

(51) Int. Cl.
  *H04N 5/343* (2011.01)
  *H04N 7/26* (2006.01)
  *H04N 7/48* (2006.01)
  *H04N 7/50* (2006.01)
(52) U.S. Cl. ............... 375/240.24; 375/240.26
(58) Field of Classification Search ............ None
  See application file for complete search history.

(56) References Cited

U.S. PATENT DOCUMENTS

| | | | |
|---|---|---|---|
| 2003/0227977 A1* | 12/2003 | Henocq | 375/240.26 |
| 2005/0175099 A1 | 8/2005 | Sarkijarvi | |
| 2006/0088191 A1 | 4/2006 | Zhang | |
| 2006/0245497 A1 | 11/2006 | Tourapis | |
| 2007/0030901 A1 | 2/2007 | Joch et al. | |
| 2007/0058718 A1* | 3/2007 | Shen et al. | 375/240.12 |
| 2008/0002770 A1 | 1/2008 | Ugur | |
| 2008/0043831 A1 | 2/2008 | Sethuraman et al. | |
| 2008/0151106 A1 | 6/2008 | Verburgh | |
| 2008/0152000 A1 | 6/2008 | Kaushik | |
| 2008/0152005 A1 | 6/2008 | Oguz | |
| 2008/0187046 A1 | 8/2008 | Joch et al. | |
| 2009/0110066 A1 | 4/2009 | Wang et al. | |
| 2010/0027662 A1 | 2/2010 | Pigeon | |
| 2010/0296580 A1* | 11/2010 | Metoevi et al. | 375/240.16 |

FOREIGN PATENT DOCUMENTS

| | | |
|---|---|---|
| EP | 2234083 | 6/2011 |
| WO | WO 2010132976 A1 * | 11/2010 |

OTHER PUBLICATIONS

International Search Report, PCT/CA2009/001807, Mar. 8, 2010.*
Written Opinion of the International Searching Authority, PCT/CA2009/001807, Mar. 8, 2010.*

(Continued)

*Primary Examiner* — Nhon Diep
*Assistant Examiner* — David N Werner
(74) *Attorney, Agent, or Firm* — IP-Mex Inc.; Victoria Donnelly

(57) ABSTRACT

A method and system for generation of a block mode conversion table for use in online transcoding of a sequence of input images in a first format to a sequence of output images in a second format are described. The table is based on a sequence of training images and provides an effective mapping between the encoding block modes and respective candidate transcoding block modes used during the online transcoding. The method utilizes the encoding block mode, the motion vectors and the residual information extracted during the decoding of the training image to generate the block mode conversion table. A corresponding system is also provided.

27 Claims, 32 Drawing Sheets

400

| MPEG-4 coding modes \ H264 coding modes | Intra 4x4 | Intra 16x16 | SKIP | Inter 16x16 | Inter 16x8 | Inter 8x16 | Inter 8x8 | sb8X8 | sb8X4 | sb4X8 | sb4X4 |
|---|---|---|---|---|---|---|---|---|---|---|---|
| Intra-I (91%) | 54.3% | 45.7% | 0.0% | 0.0% | 0.0% | 0.0% | 0.0% | 0.0% | 0.0% | 0.0% | 0.0% |
| Intra-P (9%) | 0.0% | 0.0% | 21.9% | 51.2% | 12.2% | 4.9% | 9.8% | 68.8% | 0.0% | 12.5% | 18.7% |
| Inter16x16_case1 (17%) | 0.0% | 0.0% | 73.6% | 25.3% | 0.6% | 0.5% | 0.0% | 0.0% | 0.0% | 0.0% | 0.0% |
| Inter16x16_case2 (37%) | 0.0% | 0.0% | 26.4% | 66.4% | 3.4% | 3.2% | 0.6% | 98.0% | 0.6% | 0.6% | 0.8% |
| Inter16x16_case3 (10%) | 0.0% | 0.0% | 1.9% | 81.3% | 7.2% | 5.7% | 3.9% | 89.2% | 2.8% | 6.8% | 1.2% |
| Inter8x8 (25%) | 0.0% | 0.0% | 2.8% | 37.7% | 15.6% | 19.3% | 24.6% | 88.7% | 3.4% | 4.9% | 3.0% |
| SKIP (11%) | 0.0% | 0.0% | 89.3% | 10.2% | 0.3% | 0.2% | 0.0% | 0.0% | 0.0% | 0.0% | 0.0% |

OTHER PUBLICATIONS

Liu, B. Zaccarin, A.: "New fast algorithms for the estimation of block motion vectors," IEEE Transactions on Circuits and Systems for Video Technology, vol. 3, No. 2, pp. 148-157, Apr. 1993 doi: 10.1109/76.212720.

W. Li and E. Salari "Successive Elimination Algorithm for Motion Estimation", IEEE Transactions on Image Processing, vol. 4, Issue 1, Jan. 1995, pp. 105-107.

F. Tombari, S. Mattocia, L. Di Stefano, "Template Matching Based on Lp Norm Using Sufficient Conditions with Incremental Approximation", IEEE International Conference on Video and Signal Based Surveillance, Nov. 2006, p. 20.

U. Koc and K.J.R. Liu, "Interpolation-free Subpixel Motion Estimation Technique in DCT Domain", IEEE Transactions on Circuits and Systems for Video Technology, vol. 8, Issue 4, Aug. 1998, pp. 460-487.

S. Lee, S.-I Chae, "Motion Estimation Algorithm using Low Resolution Quantization", Electronic Letters, vol. 21. No. 7, Mar. 28th, 1996, p. 647.

C.-K. Cheung, L.-M. Po, "A Hierarchical Block Motion Estimation Algorithm using Partial Distortion Measure" IEEE International Conference on Image Processing, vol. 3, Oct. 1997, pp. 606-609.

Y.-L. Chan, W.-C. Siu, "New Adaptive Pixel Decimation for Block Motion Vector Estimation", IEEE Transactions on Circuits and Systems for Video Technology, vol. 6, Issue 1, Feb. 1996, pp. 113-118.

S. Suthaharan, S.-W. Kim, and K.R. Rao "A new quality metric based on just-noticeable difference, perceptual regions, edge extraction, and human vision", Canadian Journal Electr. Comput. Eng., vol. 30, No. 2, Spring 2005.

T. Toivonen and J. Heikkila "Efficient Method for Half-Pixel Block Motion Estimation Using Block Differentials", Published by Springer-Verlag, International Workshop VLBV, Madrid, Spain, Sep. 18-19, 2003.

K.-C. Hui, W.-C. Siu, and Y.-L. Chan "New Adaptive Partial Distortion Search Using Clustered Pixel Matching Error Characteristic" IEEE Transactions on Image Processing, vol. 14, No. 5., May 2005 p. 597.

C. J. Duanmu, M. O. Ahmad "Fast Block Motion Estimation With 8-Bit Partial Sums Using SIMD Architectures" IEEE Transactions of Circuits and Systems for Video Technology, vol. 17, No. 8, Aug. 2007, p. 1041.

B. Liu, A. Zaccarin "New Fast Algorithms for the Estimation of Block Motion Vectors" IEEE Transactions on Circuits and Systems for Video technology, vol. 3, No. 2, Apr. 1993, p. 148.

Y.K. Lee et al., MPEG-4 to H.264 Transcoding, IEEE Tencon, Nov. 2005, p. 6, Ecole de Technologie Superieure.

ISO/IEC 14496-2, Information technology—Coding of audio-visual objects—Part 2: Visual, Second edition, Dec. 1, 2001, p. 536, ISO/IEC.

ISSO/IEC 14496-10 AVC and ITU-T rec. H.264, Advanced Video Coding for Generic Audiovisual Services,Series H: Audiovisual and Multimedia Systems,Infrastructure of Audiovisual Services—Coding of Moving Video, Mar. 2005, p. 343.

3GPP2 C.S0045-A, Multimedia Messaging Service (MMS) Media Format and Codecs for cdma2000 Spread Spectrum Systems, Version 1.0, Mar. 31, 2006, p. 22, 3GPP2.

3GPP, Technical Specification Group Services and System Aspects, Transparent end-to-end Packet-switched Streaming Service (PSS), Protocols and codecs (Release 7), Mar. 2009, p. 17, 3GPP.

3GPP, Technical Specification Group Services and System Aspects, Multimedia Messaging Service (MMS), Media formats and codecs (Release 7), Jun. 2007, p. 17, 3GPP.

3GPP2 C.S0046-0, 3G Multimedia Streaming Services, 3G Multimedia Streaming Services, Version 1.0, Feb. 21, 2006, p. 59, 3GPP.

B. Shen, From 8-Tap DCT to 4-Tap Integer-Transform for MPEG to H.264/AVC Transcoding, IEEE International Conference on Image Processing (ICIP),vol. 1, pp. 115-118, Oct. 2004.

Y.K. Lee et al., MPEG-4 to H.264 Transcoding using Macroblock Statistics, IEEE International Conference on Multimedia and Expo, Jul. 2006, pp. 57-60.

Y. Liang et al., MPEG-4 to H.264/AVC Transcoding, The International Wireless Communications and Mobile Computing Conference, Aug. 2007, pp. 689-693.

T.N. Dinh et al., Reducing Spatial Resolution for MPGE-4 / H.264 Transcoding with Efficient Motion Reusing, The 7th International Conference on Computer and Information Technology, Oct. 2007, pp. 577-580.

S.E. Kim et al., Efficient Motion Estimation Algorithm for MPEG-4 to H.264 Transcoder, IEEE International Conference on Image Processing (ICIP),vol. 3, pp. 659-702, Sep. 2005.

T.D. Nguyen et al., Efficient MPEG-4 . . . to H.264/AVC Transcoding with Spatial Downscaling, ETRI, vol. 29, Dec. 2007, pp. 826-828.

A. Vetro et al., Video Transcoding Architectures and Techniques: An Overview, IEEE Signal Processing Magazine, 20(2):Mar. 8-19, 2003.

B.G. Kim et al., Enhanced Inter Mode Decision Based on Contextual Prediction for P-slices in H.264/AVC Video Coding, ETRI Journal, vol. 28, No. 4, Aug. 2006, pp. 425-434.

A.M. Tourapis, Enhanced Predictive Zonal Search for Single and Multiple Frame Motion Estimation, Visual Communications and Image Processing, Jan. 2002, pp. 1069-1079.

J. Bialkowski et al., Overview of Low-Complexity Video Transcoding from H.263 to H.264, IEEE International Conference on Multimedia and Expo, Jul. 2006, pp. 49-52.

G. Sullivan, Draft Text of Recommendation H.263 Version 2 ("H. 263+") for Decision, Sep. 25, 1997, ITU.

M. Alberink et al., GigaCE/D1.11 project, Telematica Instituut, Enschede, The Netherlands, Jul. 21, 2001.

S. Zhu et al., a New Diamond Search Algorithm for Fast Block-Matching Motion Estimation, IEEE Transactions on Image Processing, vol. 9, No. 2, Feb. 2000, pp. 287-290, IEEE.

3GPP TS 26.140 v10.0.0, "Multimedia Messaging Service (MMS); Media formats and codecs (Release 10)," Mar. 2011.

I. Metoevi, S. Coulombe, "Efficient MPEG-4 to H.264 transcoding exploiting MPEG-4 block modes, motion vectors, and residuals," ISCIT (International Symposium on Communications and Information Technologies), Incheon, South Korea, Sep. 2009.

K.P. Lim, G. Sullivan and T. Wiegand, "Text Description of Joint Model Reference Encoding Methods and Decoding Concealment Methods," Joint Video Team Document JVT-O079, Apr. 2005.

J. R. Jain and A. K. Jain, "Displacement Measurement and its Application in Inter-Frame Image Coding," IEEE Transactions on Communications, vol. COM-29, pp. 1709-1808, Dec. 1981.

A.M. Tourapis, O.C. Au and M.L. Liou, "Predictive Motion Vector Field Adaptive Search Technique (PMVFAST)- Enhancing Block Based Motion Estimation," Department of Electrical and Electronic Engineering, Hong Kong University of Science and Technology, Hong Kong, 2000.

Hur, Jae-Ho and Lee, Yung-Lyul Lee "H.264 to MPEG-4 Transcoding Using Block Type Information" TENCON 2005, Melbourne, pp. 1-6 Nov. 24, 2005.

Oh, Seung-Kyun et al. "Motion Vector Estimation and Adaptive Refinement for the MPEG-4 to H264/AVC Video Transcoder" Dec. 4-7, 2006.

Nguyen et al. "Efficient Video Transcoding Between H.263 and H264/AVC Standards" May 23-26, 2005.

Nguyen et al. "Efficient Video Transcoding from H.263 to H.264/AVC Standard with Enhanced Rate Control" Shcool of Electrical & Electronic Engineering, Mayang Technological University, Journal on Applied Signal Processing, vol. 2006, pp. 1-15, Feb. 18, 2006.

ISR and WO, CA, Apr. 7, 2009, PCT.

H.R Lindman Analysis of variance in complex experimental designs, W.H. Freeman &Co, Hillsdale, N J USA, 1974, pp. 21-50, pp. 88-136.

3GPP2 C.S0045-A, "Multimedia Messaging Service (MMS) Media Format and Codecs for cdma2000 Spread Spectrum Systems", version 1.0, Mar. 2006.

ITU-T/SG16, "Video codec test model, TMN8," Portland, Jun. 1997.

S. Borman, M.A. Robertson, R. L. Stevenson, Block-matching subpixel motion estimation from noisy undersampled frames: an emperial performance evaluation, Proc. SPIE 3653, Visual Communications and Image Processing '99, 1442 (Dec. 28, 1998); doi: 10.1117112/33456

Intel Integrated Performance Primitives 5.3—Code Samples. [Online]. http://software.intel.com/en-us/articles/ intelintegrated-performance-primitives-code-samples/ (last accessed Sep. 2nd 2008).

H.264/AVC reference software JM 15.1 [Online]. http://iphome.hhi.de/suehring/tml/ (last accessed Mar. 2nd 2009).

J. Bialkowski, M. Menden, M. Barkowsky, K. Illgner, a. Kaup, "A fast H.263 to H.264 inter-frame transcoder with motion vector refinement," presented at the Picture Coding Symposium (PCS), San Francisco, Dec. 2004.

J. Bialkowski, M. Barkowsky, and A. Kaup, Fast video transcoding from H.263 to H.264/MPEG-4 AVC, Multimedia Tools Appl. 35, 2 (Nov. 2007), pp. 127-146, 2007; doi:10.1007/s11042-007-0126-7.

Q. Tang, P. Nasiopoulis, R. Ward "Fast block size prediction for MPEG-2 to H. 264/AVC transcoding," Acoustics, Speech and Signal Processing, 2008. ICASSP 2008. IEEE International Conference on, vol., no;, pp. 1029-1032, Mar. 31, 2008-Apr. 4, 2008; doi: 10.1109/ICASSP.2008.4517788.

V. Bhaskaran, K. Konstantinides. Image and Video Compression Standards: Algorithms and Architectures.(2nd ed.) (The Springer International Series in Engineering and Computer Science). Kluwer Academic Publishers, Norwell, MA, USA, Jun. 1997, 472 pages.

ISO/IEC 14496-5:2001, "Information technology—Coding of audio-visual objects—Part 5: Reference software," second edition, Feb. 2005.

\* cited by examiner

| H264 coding modes / MPEG-4 coding modes | Intra 4x4 | Intra 16x16 | SKIP | Inter 16x16 | Inter 16x8 | Inter 8x16 | Inter 8x8 | sb8x8 | sb8x4 | sb4x8 | sb4x4 |
|---|---|---|---|---|---|---|---|---|---|---|---|
| Intra | 49.2% | 41.4% | 2.1% | 4.8% | 1.1% | 0.5% | 0.9% | 68.8% | 0.0% | 12.5% | 18.7% |
| Inter16x16 (64%) | 0.0% | 0.0% | 31.3% | 61.6% | 3.2% | 2.9% | 1.0% | 92.7% | 1.9% | 4.4% | 1.0% |
| Inter8x8 (25%) | 0.0% | 0.0% | 2.8% | 37.7% | 15.6% | 19.3% | 24.6% | 88.7% | 3.4% | 4.9% | 3.0% |
| Skip (11%) | 0.0% | 0.0% | 89.3% | 10.2% | 0.3% | 0.2% | 0.0% | 0.0% | 0.0% | 0.0% | 0.0% |

*Figure 1 (Prior Art)*

| MPEG-4 coding modes \ H264 coding modes | Intra 4x4 | Intra 16x16 | SKIP | Inter 16x16 | Inter 16x8 | Inter 8x16 | Inter 8x8 | sb8X8 | sb8X4 | sb4X8 | sb4X4 |
|---|---|---|---|---|---|---|---|---|---|---|---|
| Intra-I (91%) | 54.3% | 45.7% | 0.0% | 0.0% | 0.0% | 0.0% | 0.0% | 0.0% | 0.0% | 0.0% | 0.0% |
| Intra-P (9%) | 0.0% | 0.0% | 21.9% | 51.2% | 12.2% | 4.9% | 9.8% | 68.8% | 0.0% | 12.5% | 18.7% |
| Inter16x16_case1 (17%) | 0.0% | 0.0% | 73.6% | 25.3% | 0.6% | 0.5% | 0.0% | 0.0% | 0.0% | 0.0% | 0.0% |
| Inter16x16_case2 (37%) | 0.0% | 0.0% | 26.4% | 66.4% | 3.4% | 3.2% | 0.6% | 98.0% | 0.6% | 0.6% | 0.8% |
| Inter16x16_case3 (10%) | 0.0% | 0.0% | 1.9% | 81.3% | 7.2% | 5.7% | 3.9% | 89.2% | 2.8% | 6.8% | 1.2% |
| Inter8x8 (25%) | 0.0% | 0.0% | 2.8% | 37.7% | 15.6% | 19.3% | 24.6% | 88.7% | 3.4% | 4.9% | 3.0% |
| SKIP (11%) | 0.0% | 0.0% | 89.3% | 10.2% | 0.3% | 0.2% | 0.0% | 0.0% | 0.0% | 0.0% | 0.0% |

*Figure 4(a)*

| QCIF Videos | | 32 Kbit/s | | | | 64 Kbit/s | | | |
| --- | --- | --- | --- | --- | --- | --- | --- | --- | --- |
| | | Cas-cade | MV+MS | Statis-tics | Statis-tics+ref | Propo-sed | Cas-cade | MV+MS | Statis-tics | Statis-tics+ref | Propo-sed |
| Akiyo | PSNR(dB) | 39.18 | -0.49 | -2.34 | -0.2 | -0.46 | 42.27 | -0.14 | -1.7 | -0.08 | -0.33 |
| | Speed up | 1 | 1.54 | 2.28 | 1.41 | 1.9 | 1 | 1.59 | 2.44 | 1.4 | 2.03 |
| Miss-America | PSNR(dB) | 40.19 | -1.23 | -2.38 | -0.48 | -0.54 | 43.08 | -0.61 | -1.91 | -0.33 | -0.56 |
| | Speed up | 1 | 1.72 | 2.7 | 1.56 | 2.25 | 1 | 1.82 | 3.21 | 1.68 | 2.73 |
| Mobile | PSNR(dB) | 23.54 | -3.54 | -4.98 | -0.68 | -0.44 | 26.09 | -1.01 | -4.6 | -0.27 | -0.16 |
| | Speed up | 1 | 1.82 | 2.84 | 1.62 | 2.12 | 1 | 1.78 | 3.47 | 1.73 | 2.47 |
| Car-phone | PSNR(dB) | 30.23 | -7.34 | -3.61 | -1.38 | -0.77 | 33.37 | -2.68 | -2.74 | -0.65 | -0.42 |
| | Speed up | 1 | 2.02 | 2.76 | 1.45 | 1.85 | 1 | 1.97 | 3.37 | 1.59 | 2.22 |
| News | PSNR(dB) | 31.89 | -2.11 | -2.61 | -0.63 | -0.46 | 35.93 | -0.94 | -2.2 | -0.43 | -0.43 |
| | Speed up | 1 | 1.74 | 2.45 | 1.45 | 1.87 | 1 | 1.8 | 2.81 | 1.54 | 2.08 |
| Foreman | PSNR(dB) | 29.22 | -7.7 | -3.83 | -1.25 | -0.6 | 32.65 | -2.97 | -3.01 | -0.56 | -0.29 |
| | Speed up | 1 | 2.1 | 2.86 | 1.56 | 1.94 | 1 | 2.04 | 3.57 | 1.65 | 2.29 |
| Average speed up | | 32.38 | -.374 | -3.29 | -0.77 | -0.55 | 35.57 | -1.39 | -2.69 | -0.39 | -0.36 |
| Average PSNR(dB) | | 1 | 1.82 | 2.65 | 1.51 | 1.99 | 1 | 1.83 | 3.14 | 1.6 | 2.3 |

*Figure 15(a)*

| QCIF Videos | | 96 Kbit/s | | | | 128 Kbit/s | | | | |
|---|---|---|---|---|---|---|---|---|---|---|
| | | Cas-cade | MV+MS | Statis-tics | Statis-tics+ref | Propo-sed | Cas-cade | MV+MS | Statis-tics | Statis-tics+ref | Propo-sed |
| Akiyo | PSNR(dB) | 43.98 | -0.12 | -1.16 | -0.08 | -0.48 | 45.28 | -0.09 | -0.89 | -0.09 | -0.35 |
| | Speed up | 1 | 1.66 | 2.55 | 1.42 | 2.35 | 1 | 1.73 | 2.6 | 1.44 | 2.34 |
| Miss-America | PSNR(dB) | 44.42 | -0.39 | -1.59 | -0.24 | -0.8 | 45.34 | -0.33 | -1.37 | -0.21 | -0.79 |
| | Speed up | 1 | 1.84 | 3.38 | 1.69 | 3.13 | 1 | 1.85 | 3.48 | 1.7 | 3.23 |
| Mobile | PSNR(dB) | 27.41 | -0.59 | -3.79 | -0.13 | -0.14 | 28.3 | -0.36 | -3.12 | -0.06 | -0.17 |
| | Speed up | 1 | 1.8 | 3.86 | 1.76 | 2.66 | 1 | 1.81 | 4.02 | 1.77 | 2.8 |
| Mobile | PSNR(dB) | 35.2 | -1.5 | -2.31 | -0.39 | -0.46 | 36.49 | -0.98 | -2 | -0.29 | -0.44 |
| | Speed up | 1 | 1.97 | 3.72 | 1.65 | 2.53 | 1 | 1.97 | 3.9 | 1.67 | 2.65 |
| Car-phone | PSNR(dB) | 38.24 | -0.71 | -1.93 | -0.46 | -0.64 | 39.78 | -0.49 | -1.49 | -0.36 | -0.54 |
| | Speed up | 1 | 1.86 | 2.95 | 1.5 | 2.31 | 1 | 1.82 | 2.89 | 1.5 | 2.27 |
| News | PSNR(dB) | 34.31 | -1.41 | -2.39 | -0.3 | -0.34 | 35.48 | -0.91 | -2.09 | -0.23 | -0.36 |
| | Speed up | 1 | 1.99 | 3.87 | 1.67 | 2.62 | 1 | 1.96 | 3.94 | 1.7 | 2.69 |
| Foreman | Average speed up | 37.26 | -0.79 | -2.2 | -0.27 | -0.48 | 38.45 | -0.53 | -1.83 | -0.21 | -0.44 |
| | Average PSNR(dB) | 1 | 1.85 | 3.39 | 1.62 | 2.6 | 1 | 1.86 | 3.47 | 1.63 | 2.66 |

*Figure 15(b)*

| CIF Videos | | 128 Kbit/s | | | | 256 Kbit/s | | | |
|---|---|---|---|---|---|---|---|---|---|
| | | Cascade | MV+MS | Statistics | Statistics+ref | Proposed | Cascade | MV+MS | Statistics | Statistics+ref | Proposed |
| Mother-daughter | PSNR(dB) | 38.63 | -2.11 | -2.15 | -0.62 | -0.38 | 41.67 | -0.87 | -1.9 | -0.33 | -0.37 |
| | Speed up | 1 | 1.85 | 2.92 | 1.59 | 2.2 | 1 | 1.86 | 3.45 | 1.67 | 2.6 |
| Stefan | PSNR(dB) | 25.85 | -6.29 | -4.97 | -1.09 | -0.45 | 29.54 | -2.3 | -4.08 | -0.63 | -0.28 |
| | Speed up | 1 | 2 | 2.82 | 1.5 | 1.83 | 1 | 2.01 | 3.61 | 1.67 | 2.26 |
| Waterfall | PSNR(dB) | 32.19 | -2.36 | -4.23 | -0.89 | -0.26 | 34.83 | -1.06 | -3.73 | -0.39 | -0.16 |
| | Speed up | 1 | 1.95 | 3.36 | 1.73 | 2.29 | 1 | 1.89 | 4.1 | 1.81 | 2.7 |
| Foreman | PSNR(dB) | 31.15 | -8.62 | -4.33 | -1.83 | -1.13 | 34.5 | -2.92 | -3.05 | -1 | -0.67 |
| | Speed up | 1 | 2.11 | 2.88 | 1.55 | 1.99 | 1 | 2.03 | 3.5 | 1.66 | 2.36 |
| Flower | PSNR(dB) | 23.65 | -3.05 | -3.36 | -0.43 | -0.27 | 26.23 | -0.98 | -2.79 | -0.2 | -0.2 |
| | Speed up | 1 | 1.94 | 2.91 | 1.53 | 1.94 | 1 | 1.82 | 3.4 | 1.6 | 2.25 |
| Tempete | PSNR(dB) | 26.41 | -6.24 | -4.54 | -0.95 | -0.48 | 29.17 | -1.95 | -3.76 | -0.41 | -0.25 |
| | Speed up | 1 | 2.08 | 2.78 | 1.58 | 1.98 | 1 | 1.95 | 3.55 | 1.72 | 2.35 |
| Average speed up | | 29.65 | -4.78 | -3.93 | -0.97 | -0.5 | 32.66 | -1.68 | -3.22 | -0.49 | -0.32 |
| Average PSNR(dB) | | 1 | 1.99 | 2.94 | 1.58 | 2.04 | 1 | 1.93 | 3.6 | 1.69 | 2.42 |

| CIF Videos | | 384 Kbit/s | | | | | 512 Kbit/s | | | | |
|---|---|---|---|---|---|---|---|---|---|---|---|
| | | Cas-cade | MV+MS | Statis-tics | Statis-tics+ref | Propo-sed | Cas-cade | MV+MS | Statis-tics | Statis-tics+ref | Propo-sed |
| Mother-daughter | PSNR(dB) | 43.12 | -0.54 | -1.71 | -0.19 | -0.86 | 44.14 | -0.39 | -1.53 | -0.15 | -0.83 |
| | Speed up | 1 | 1.87 | 3.9 | 1.69 | 3.1 | 1 | 1.9 | 3.77 | 1.72 | 3.29 |
| Stefan | PSNR(dB) | 31.17 | -1.17 | -3.2 | -0.37 | -0.27 | 32.27 | -0.79 | -2.61 | -0.26 | -0.24 |
| | Speed up | 1 | 1.96 | 3.96 | 1.7 | 2.49 | 1 | 1.96 | 4.24 | 1.75 | 2.65 |
| Water-fall | PSNR(dB) | 36.08 | -0.6 | -3.07 | -0.21 | -0.78 | 36.88 | -0.39 | -2.38 | -0.13 | -0.68 |
| | Speed up | 1 | 1.9 | 4.39 | 1.85 | 3.29 | 1 | 1.92 | 4.39 | 1.85 | 3.44 |
| Foreman | PSNR(dB) | 36.2 | -1.67 | -2.5 | -0.67 | -0.79 | 37.36 | -1.17 | -2.13 | -0.48 | -0.75 |
| | Speed up | 1 | 2.02 | 3.8 | 1.71 | 2.71 | 1 | 2.01 | 3.96 | 1.7 | 2.84 |
| Flower | PSNR(dB) | 27.74 | -0.67 | -2.32 | -0.17 | -0.22 | 28.87 | -0.49 | -1.99 | -0.14 | -0.24 |
| | Speed up | 1 | 1.81 | 3.56 | 1.63 | 2.38 | 1 | 1.8 | 3.68 | 1.65 | 2.44 |
| Tempete | PSNR(dB) | 30.68 | -1.12 | -3.1 | -0.25 | -0.26 | 31.73 | -0.77 | -2.58 | -0.14 | -0.23 |
| | Speed up | 1 | 1.93 | 3.94 | 1.76 | 2.61 | 1 | 1.96 | 4.15 | 1.81 | 2.71 |
| Average speed up | | 34.17 | -0.96 | -2.65 | -0.31 | -0.53 | 35.21 | -0.67 | -2.2 | -0.22 | -0.5 |
| Average PSNR(dB) | | 1 | 1.91 | 3.93 | 1.72 | 2.76 | 1 | 1.93 | 4.03 | 1.75 | 2.89 |

*Figure 15(d)*

METHOD AND SYSTEM FOR GENERATING BLOCK MODE CONVERSION TABLE FOR EFFICIENT VIDEO TRANSCODING

RELATED APPLICATIONS

The present application claims benefit from the U.S. provisional application Ser. No. 61/180,316 filed on May 21, 2009 for "Method and System for Efficient MPEG-4 to H.264 Transcoding", the entire contents of which being incorporated herein by reference.

FIELD OF THE INVENTION

The present invention relates to transcoding of videos, and in particular, to a method and system for MPEG-4 to H.264 transcoding using MPEG-4 block modes, motion vectors, and residuals.

BACKGROUND OF THE INVENTION

Multimedia applications need to handle videos or sequences of images, each image comprising one or more macroblocks of pixels. The diversity of multimedia applications and terminals receiving multimedia content inevitably causes interoperability problems. For instance, current mobile terminals support different video encoding standards, such as H.263, MPEG-4 (Moving Pictures Experts Group) described in ISO/IEC 14496-2, "Information technology—Coding of audio-visual objects—Part 2: Visual," second edition, December 2001. and H.264/AVC described in ISO/IEC 14496-10 AVC and ITU-T rec. H.264, "Advanced video coding for generic audiovisual services," March 2005. The transcoding of video content to a specific resolution, encoding standard, and bit rate constraints has become a necessity in order to ensure the success of evolving multimedia communications. The MPEG-4 visual simple profile (VSP) is widely used in today's multimedia services, including mobile videoconferencing, multimedia message service (MMS), and streaming within the scope of 3GPP/3GPP2. This is described in 3GPP TS 26.234 v7.7.0, "Packet-switched Streaming Services (PSS); Protocols and codecs (Release 7)," March 2009, 3GPP TS 26.140 v7.1.0, "Multimedia Messaging Service (MMS); Media formats and codecs (Release 7)," June 2007, 3GPP2 C.S0045-A, "Multimedia Messaging Service (MMS) Media Format and Codecs for cdma200 Spread Spectrum Systems," version 1.0, March 2006 and 3GPP2 C.S0046-0, "3G Multimedia Streaming Services," version 1.0, February 2006.

The more recent H.264/AVC encoding standard provides significant improvements in compression efficiency and is expected to replace the earlier encoding standards, thereby making transcoding from MPEG-4 to H.264 inevitable.

H.264 encoding is especially complex, because of its more sophisticated coding tools. H.264 uses several encoding block modes: 4 inter modes (16×16, 16×8, 8×16, and 8×8), 4 sub-modes (8×8, 8×4, 4×8, and 4×4), a SKIP mode, and two intra prediction modes (16×16 and 4×4), a lossless mode, and PCM. To determine the best encoding block mode, H.264 uses rate distortion optimization (RDO). Therefore, for several candidate encoding modes for encoding, it will perform motion estimation (ME) and motion compensation (MC), up to 41 ME operations at quarter-pixel accuracy for a single macroblock (MB). The macroblock in video compression, represents a 16×16 block of pixels. Each macroblock contains 4 Y (luminance) blocks (of 8×8 pixels), 1 Cb (blue color difference) block, 1 Cr (red color difference) block often in 4:2:0 sampling mode (where color is subsampled by a factor of 2 horizontally and vertically with respect to the luminance). Each macroblock may have one or more partitions, the encoding block mode for the MB indicating the size of partitions within the MB.

Several studies have investigated the problem of transcoding of a video comprising a sequence of input images encoded in a first format to a sequence of output images encoded in a second format in general, and the transcoding of the sequence of input images encoded in MPEG-4 to a sequence of output images encoded in H.264 in particular. The cascade transcoding approach includes steps of fully decoding the MPEG-4 video bitstream to the spatial (pixel) domain and then re-encoding it according to the H.264 specification. The best video quality has been reached with this type of transcoding. Unfortunately, it has a high computational complexity, which is not always suitable for real-time applications.

Several methods have been proposed to reduce this computational complexity of transcoding. Examples include the paper by B. Shen, "From 8-tap DCT to 4-tap integer-transform for MPEG-4 to H.264/AVC transcoding," *IEEE international conference on image processing*, Vol. 1, pp. 115-118, October 2004, by Y. K. Lee, S. S. Lee and Y. L. Lee, "MPEG-4 to H.264 transcoding using macroblock statistics," *IEEE international conference on multimedia and expo*, pp. 57-60, July 2006 and the paper by Y. Liang, X. Wei, I. Ahmad and V. Swaminathan, "MPEG-4 to H.264/AVC transcoding," *The International Wireless Communications and Mobile Computing Conference*, pp. 689-693, August 2007. Other studies related to this issue are described in the following set of papers. These include the paper by T. N. Dinh, J. Yoo, S. Park, G. Lee, T. Y. Chang and H. J. Cho, "Reducing spatial resolution for MPEG-4/H.264 transcoding with efficient motion reusing," *IEEE international conference on computer and information technology*, pp. 577-580, October 2007, the paper by S. E. Kim, J. K. Han and J. G. Kim, "Efficient motion estimation algorithm for MPEG-4 to H.264 transcoder," *IEEE international conference on image processing*, Vol. 3, pp. 659-702, September 2005, the paper by T. D. Nguyen, G. S. Lee, J. Y. Chang and H. J. Cho, "Efficient MPEG-4 to H.264/AVC transcoding with spatial downscaling," ETRI, Vol. 29, pp. 826-828, December 2007 and the paper by A. Vetro, C. Christopoulos, and H. Sun, "Video transcoding architectures and techniques: an overview," *IEEE Signal Processing Magazine*, 20(2):18-29, 2003. The most efficient of these methods exploit the information available from the MPEG-4 decoder used during the transcoding to reduce the number of block modes to evaluate, thereby reducing ME complexity. In the paper by Lee et al., the authors exploit the frequency distribution of the H.264 block modes for a given MPEG-4 block mode in order to derive a table for obtaining transcoding block modes for MPEG-4 to H.264 transcoding. An example of such a table, Table 100, is presented in FIG. 1. Please note that the column header "MPEG-4 Coding modes" corresponds to the encoding block mode used for the input MBs whereas the row header "H.264 coding modes" corresponds to the transcoding block modes used in the transcoding. The method of Lee uses the table to identify the most probable H.264 coding modes for each given MPEG-4 coding mode. So instead of checking all H.264 coding modes they only check the most probable ones.

In the paper by Liang et al., an arbitrary mapping between MPEG-4 block modes and H.264 candidate transcoding block modes is presented without much justification, for both intra and inter blocks. Motion vectors (MVs) are either directly reused (in 16×16 transcoding block mode) or become the starting points for ME (in 16×8 and 8×16 transcoding block modes, for instance). They obtain very good speed-ups, but the transcoded image quality is degraded by 1 to 2 dB, which may be unacceptable in some applications. Techniques described in the paper by Y.-K. Lee and Y.-L. Lee. "MPEG-4 to H.264 transcoding", IEEE TENCON, November 2005, and in the paper by J. Bialkowski, M. Barkowsky and A. Kaup, "Overview of low-complexity video transcoding from H.263 to H.264". *IEEE International Conference on Multimedia and Expo (ICME)*, pp. 49-52, July 2006 reduce the number of candidate block modes to be tested but lack the necessary efficiency and require further improvement.

Therefore there is a need in the industry for developing an improved method and system for video transcoding, including generating a block mode conversion table, to avoid or mitigate the above-mentioned drawbacks of the prior art.

SUMMARY OF THE INVENTION

Therefore it is an objective of the present invention to provide an improved method and system for transcoding a sequence of input images encoded in a first format that includes MPEG-4 to a sequence of output images encoded in a second format that includes H.264.

It is another object of the present invention to provide a method and system for generating a block mode conversion table for efficient video transcoding, including MPEG-4 to H.264 transcoding.

According to one aspect of the invention, there is provided a computerized method for generating a block mode conversion table for selecting transcoding block modes required for transcoding a sequence of input images, each input image comprising one or more input macroblocks of pixels encoded in a first format into a sequence of output images, each output image comprising one or more output macroblocks of pixels encoded in a second format, the method comprising: (a1) providing training images, each training image comprising one or more training macroblocks of pixels encoded in the first format; (b1) transcoding each training macroblock (MB) into a transcoded training MB encoded in the second format by using a codec device; and (c1) generating the block mode conversion table containing multi-tuples, each multi-tuple having one tuple, another tuple, and yet another tuple, each said one tuple including a first training block mode for a sub-set of the training MBs encoded using the first training block mode, each said another tuple including a class identifier for the training MBs, identifying those MBs in the sub-set, whose residual information satisfies a predetermined set of constraints and each said yet another tuple including a list of second training block modes used by the codec device in transcoding those training macroblocks in the sub-set that have the class identifier indicated in the corresponding said another tuple.

The input MBs, output MBs, training MBs, and the transcoded training MBs have one or more partitions and the transcoding block mode, the first training block mode and the second training block mode indicate size of partitions within the output MB, the training MB and the transcoded training MB respectively. The step of computing a residual energy for the training MB is performed after the step (b1) and before the step (c1). The pre-determined set of constraints further comprises a constraint on the residual energy for the training MB. The step (b1) further comprises extracting a motion vector (MV) for the training MB and generating a motion vector for the transcoded training MB. The pre-determined set of constraints further comprises constraints on a difference between the MV for the training MB and a predicted MV for the transcoded training MB. The list in the step (c1) includes those second training block modes whose frequency of usage is above a predetermined usage threshold.

The step (c1) comprises: (a8) for each training MB, generating a record including the first training block mode, the second training block mode and the class identifier; and (b8) processing records for the training MBs for generating the block mode conversion table. The step (b8) comprises: (a9) arranging the records into groups each group characterized by a unique combination of the first training block mode and the class identifier; (b9) for each group, recording a set of the second training block modes used by the codec device for transcoding the training MBs in the group; (c9) processing the groups to generate the multi-tuples in the block mode conversion table; and (d9) storing the block mode conversion table. The step (c9) comprises: (a10) for each group creating the multi-tuple in the block mode conversion table; (b10) storing the first training block mode in said one tuple and the class identifier characterizing said each group in said another tuple; and (c10) storing the set of the second training block modes for the group in said yet another tuple. The set of the second training block modes includes those second training block modes whose frequency of usage is above a predetermined usage threshold. The first format is one of H.263, H.264, MPEG-2 and MPEG-4, and the second format is one of H.263, H.264, MPEG-2 and MPEG-4. The sequence of input images is an input video and the sequence of output images is an output video.

According to another aspect of the invention, there is provided a system for generating a block mode conversion table for selecting transcoding block modes for transcoding a sequence of input images, (each input image comprising one or more input macroblocks of pixels) encoded in a first format into a sequence of output images, each output image (comprising one or more output macroblocks of pixels) encoded in a second format, the system comprising: a processor, and a computer readable storage medium having computer readable instructions stored thereon, for execution by the processor, forming the following: (a14) a training image repository providing training images, each training image comprising one or more training macroblocks of pixels encoded in the first format; (b14) a codec device transcoding each training macroblock (MB) into a transcoded training MB encoded in the second format; and (c14) a conversion table generator module generating the block mode conversion table containing multi-tuples, each multi-tuple having one tuple, another tuple, and yet another tuple, each said one tuple including a first training block mode for a sub-set of the training MBs encoded using the first training block mode, each said another tuple including a class identifier for the training MBs, identifying those MBs in the sub-set, whose residual information satisfies a predetermined set of constraints and each said yet another tuple including a list of second training block modes used by the codec device in transcoding those training macroblocks in the sub-set that have the class identifier indicated in the corresponding said another tuple.

The input MBs, output MBs, training MBs, and the transcoded training MBs have one or more partitions and the transcoding block mode, the first training block mode and the second training block mode indicate size of partitions within the output MB, the training MB and the transcoded training MB respectively. The list in the block mode conversion table generated by the conversion table generator module (c14) includes those second training block modes whose frequency of usage is above a predetermined usage threshold.

The conversion table generator module (c14) comprises: (a17) a record generator module generating a record for each training MB, the record including the first training block mode, the second training block mode, and the class identifier; and (b17) a record processor module processing records for the training MBs for generating the block mode conversion table. The record processor module (b17) comprises: (a18) a group handler module arranging the records into groups each group characterized by a unique combination of the first training block mode and the class identifier, and for each group recording a set of the second training block modes used by the codec device for transcoding the training MBs in the group; (b18) a table maker module processing the groups to generate the multi-tuples in the block mode conversion table; and (c18) a table storage module storing the block mode conversion table. The table maker module (b18) comprises: (a19) computational means for creating the multi-tuple for each group in the block mode conversion table; and (b19) computational means for storing the first training block mode and the class identifier characterizing said each group in said one tuple and said another tuple respectively and the set of the second training block modes for the group in said yet another tuple. The set of the second training block modes includes those second training block modes whose frequency of usage is above a predetermined usage threshold. The codec device (b14) further comprises computational means for extracting a motion vector (MV) for the training MB and generating a motion vector for the transcoded training MB. The record processor module (b17) further comprises computational means for computing a residual energy for the training MB. The pre-determined set of constraints includes constraints on a difference between the MV for the training image and a predicted MV for the transcoded training image. The pre-determined set of constraints further comprises a constraint on the residual energy for the training MB. The first format is one of H.263, H.264, MPEG-2 and MPEG-4, and the second format is one of H.263, H.264, MPEG-2 and MPEG-4. The sequence of input images is an input video and the sequence of output images is an output video. A computer readable storage medium, having computer readable program code instructions stored thereon, which, when executed by a computer, perform the steps of the method as described above, is also provided.

Thus, an improved method and system for efficient video transcoding, including generating a block mode conversion table, have been provided.

BRIEF DESCRIPTION OF THE DRAWINGS

Further features and advantages of the invention will be apparent from the following description of the embodiment, which is described by way of example only and with reference to the accompanying drawings, in which:

FIG. 1 shows a sample prior art table for selecting a transcoding block mode;

FIG. 15(a) illustrates peak signal-to-noise ratio (PSNR) and speed-up results for various Quarter Common Intermediate Format (QCIF) videos and bitrates of 32 K bits/s and 64K bits/s;

FIG. 15(b) illustrates peak signal-to-noise ratio (PSNR) and speed-up results for various Quarter Common Intermediate Format (QCIF) videos and bitrates of 96 K bits/s and 128K bits/s;

FIG. 15(c) illustrates peak signal-to-noise ratio (PSNR) and speed-up results for various Common Intermediate Format (CIF) videos and bitrates of 128K bits/s and 256K bits/s;

FIG. 15(d) illustrates peak signal-to-noise ratio (PSNR) and speed-up results for various Common Intermediate Format (CIF) videos and bitrates of 384K bits/s and 512 K bits/s;

DESCRIPTION OF THE EMBODIMENTS OF THE INVENTION

Figure 2:
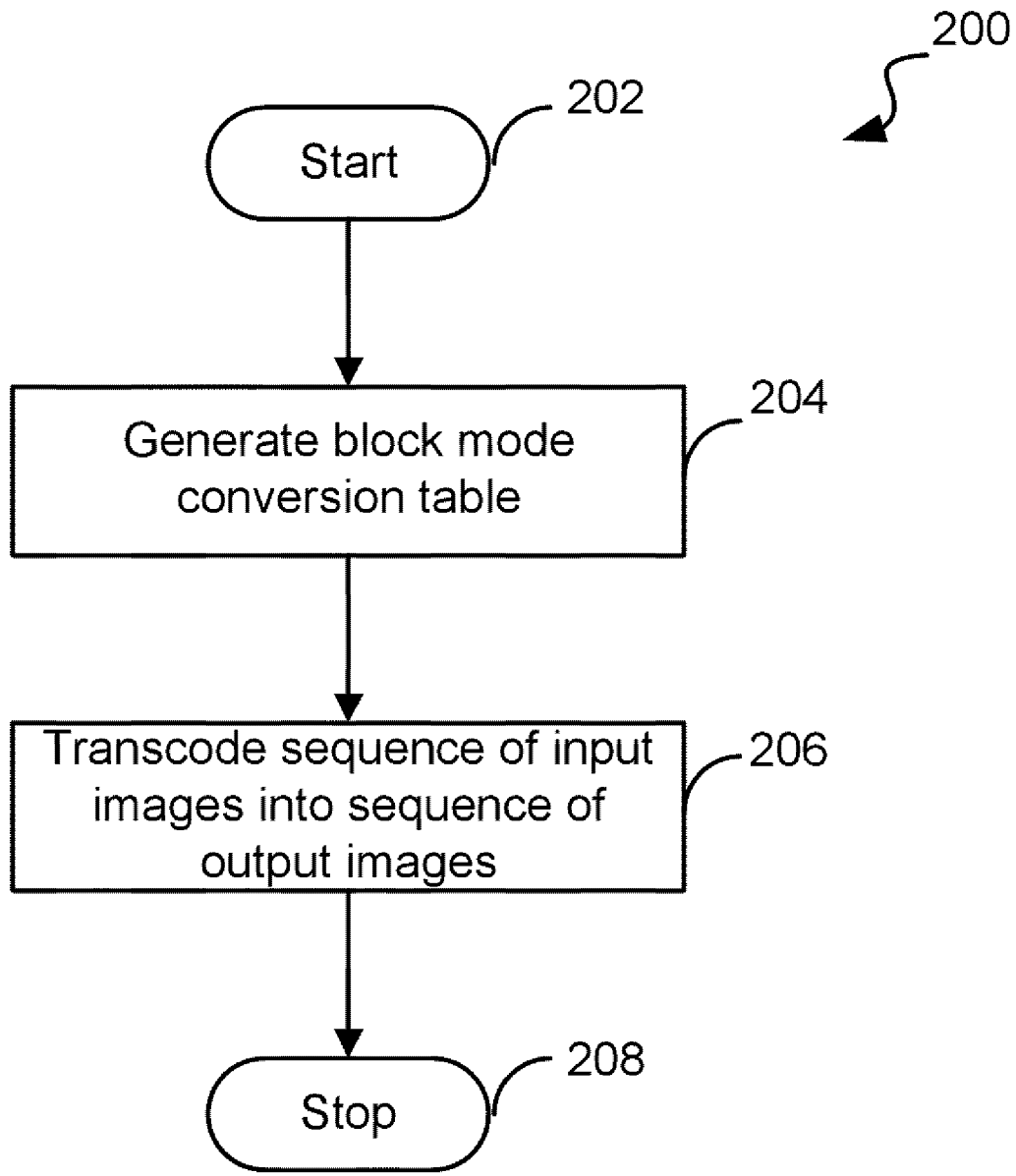
FIG. 2 illustrates a method for performing efficient video transcoding according to the embodiment of the invention.
Figure 3A:
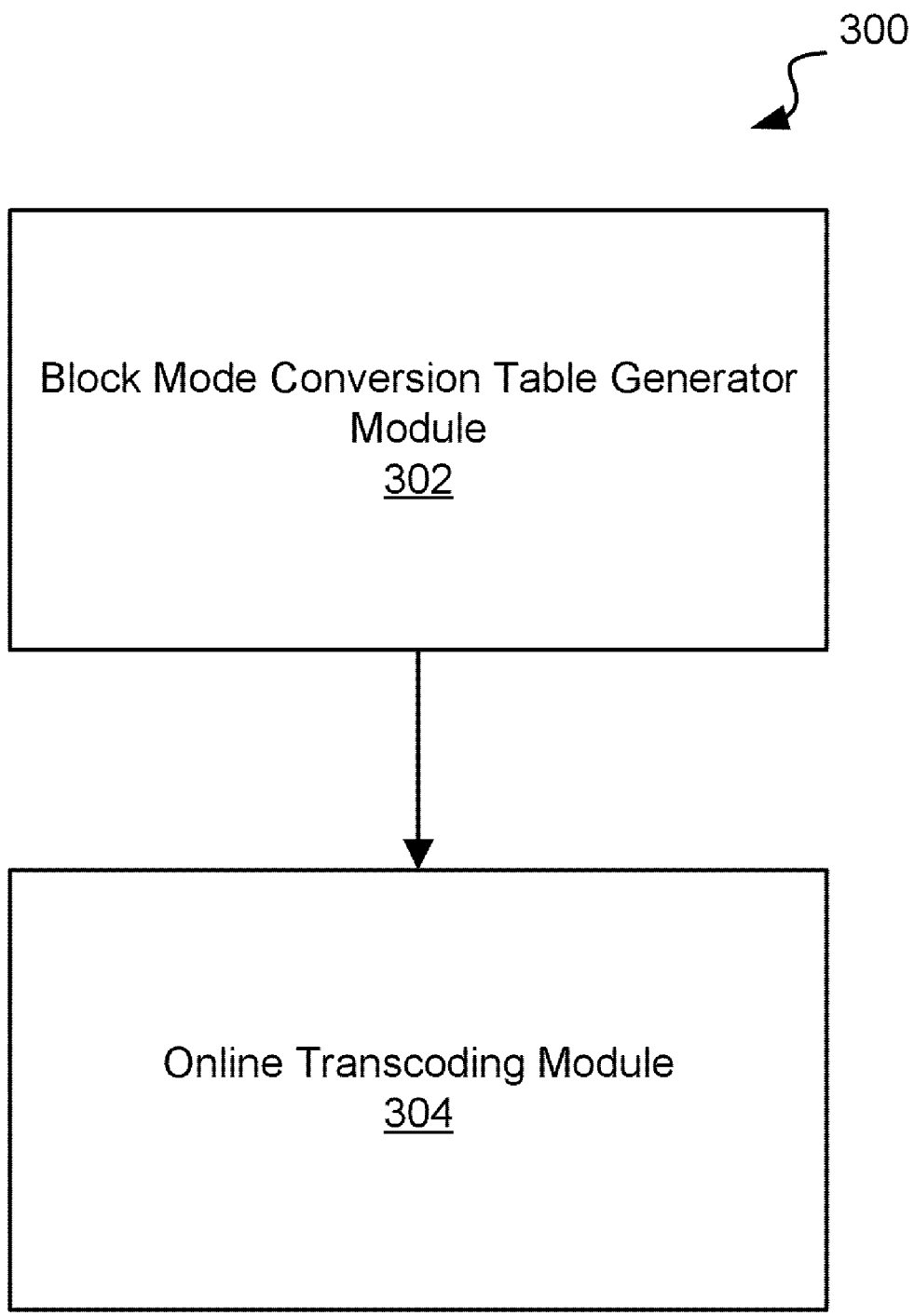
FIG. 3(a) shows a system for performing the method of FIG. 2.
Figure 3B:
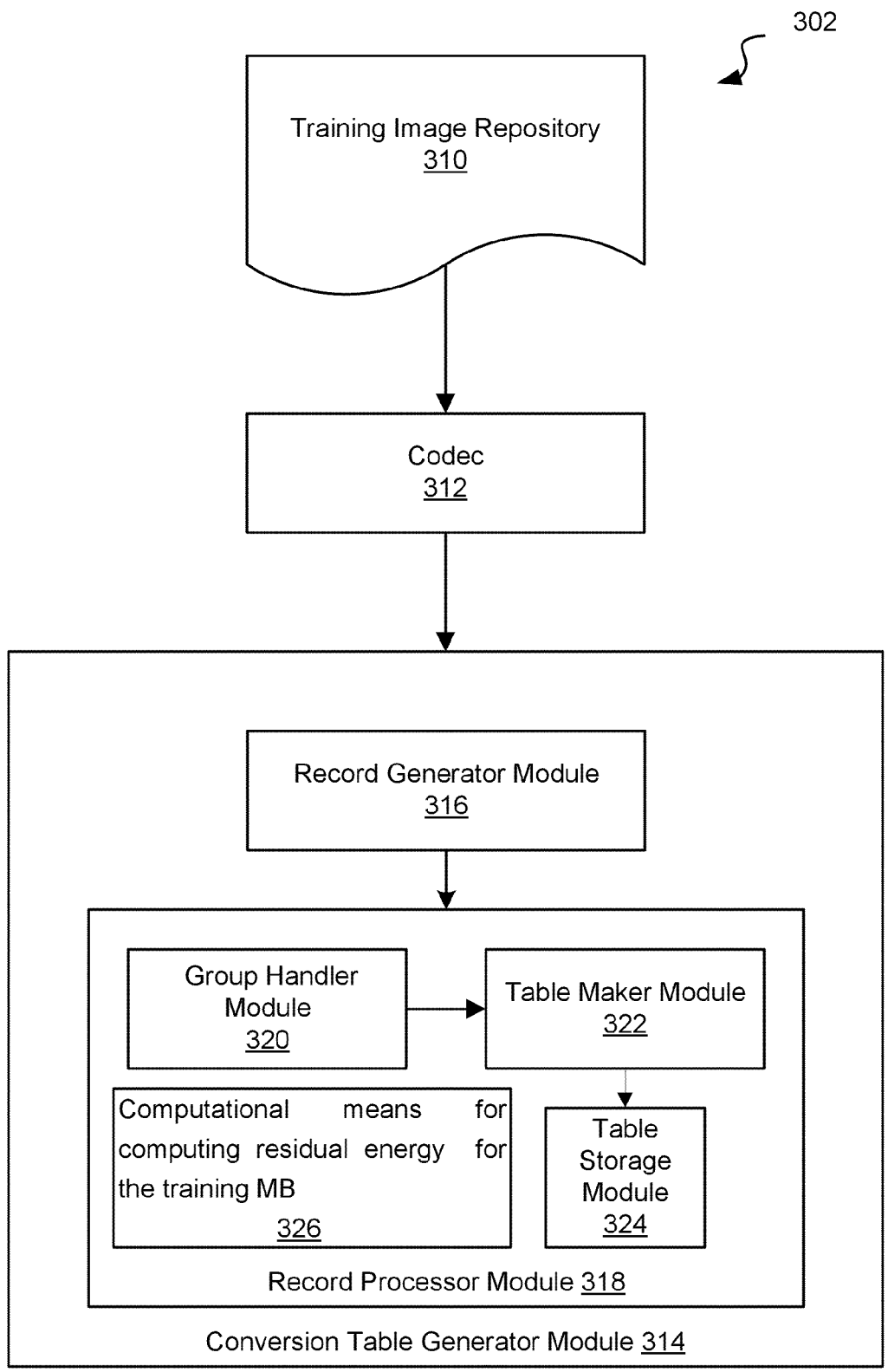
FIG. 3(b) illustrates the block mode conversion table generator 302 of FIG. 3(a) in more detail.
Figure 3C:
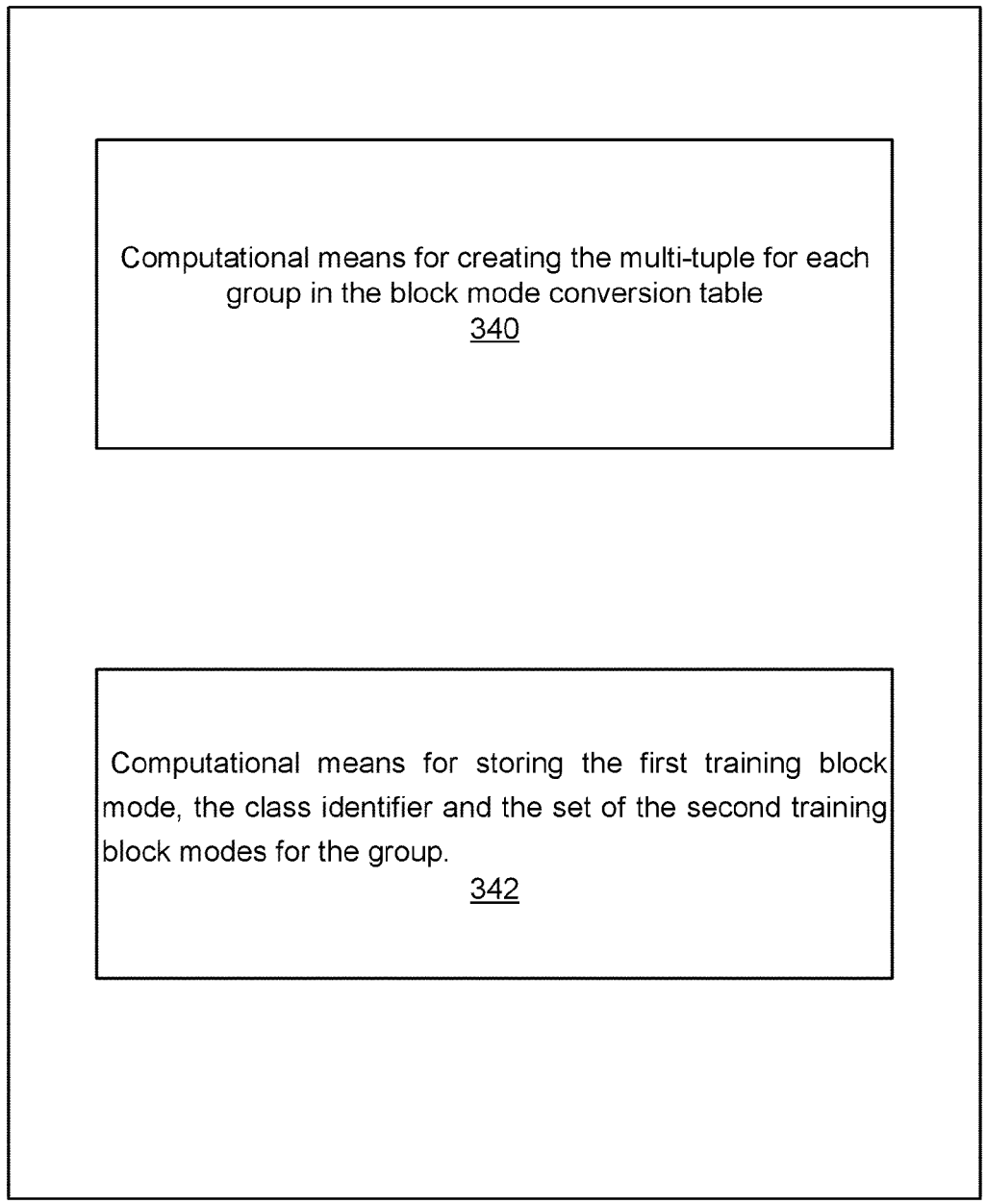
FIG. 3(c) illustrates the table maker module 322 in more detail.
Figure 3D:
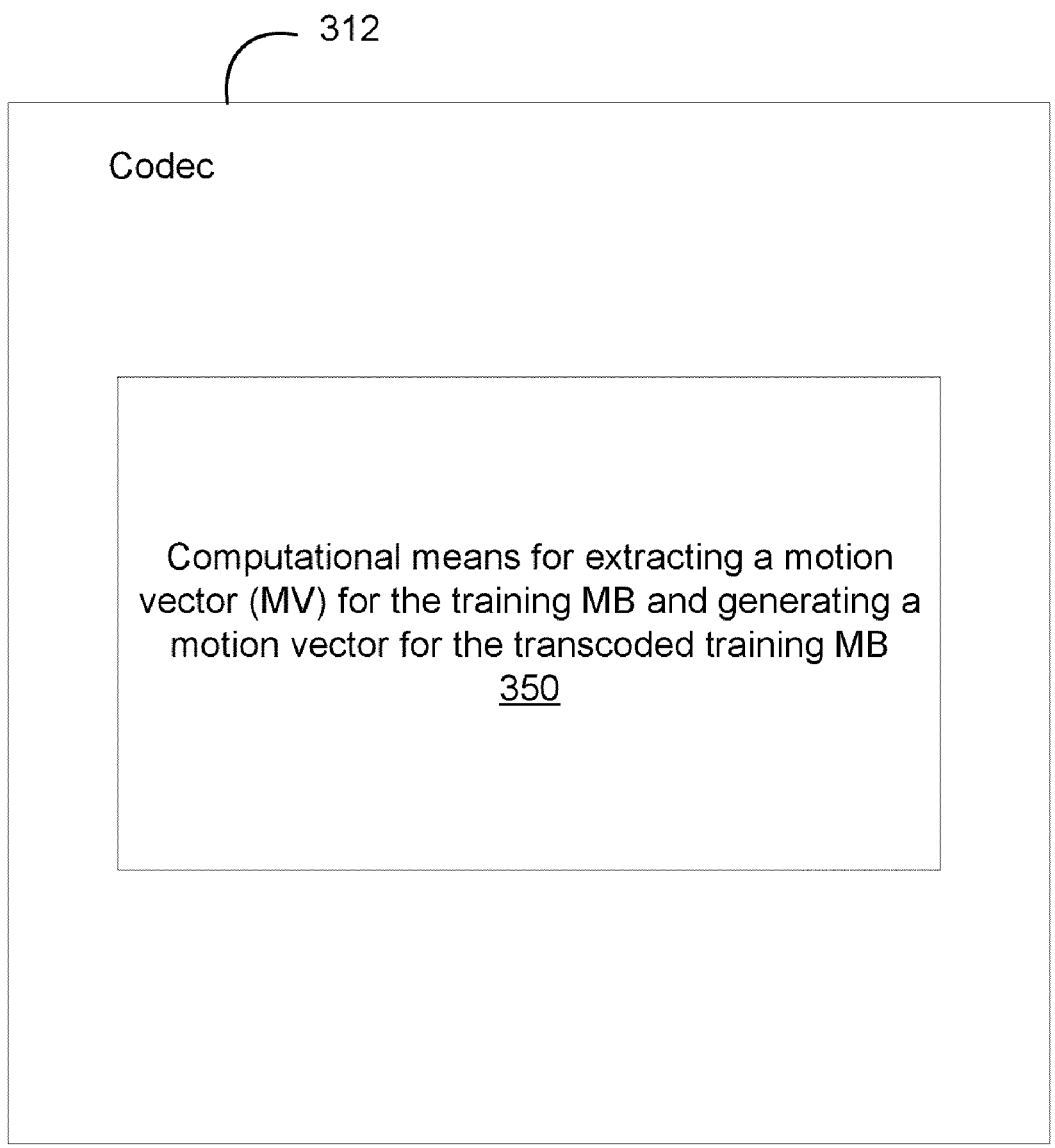
FIG. 3(d) illustrates the codec 312 in more detail.

Glossary
block mode conversion
table table for determining a set of candidate block modes encoding block mode indicates type (Intra or Inter) and size of partitions used for encoding the input MB.

first energy threshold threshold for residual energy of a partition within an input macroblock first format encoding format for input image first training block mode encoding block mode used in the encoding of a training macroblock input image contains one or more input macroblocks of pixels macroblock (MB) a 16×16 set of pixels output image contains one or more output macroblocks of pixels residual information characterizes prediction error of a block or macroblock resulting from motion estimation residual energy energy corresponding to residual information second energy threshold threshold for residual energy of an input macroblock second format encoding format for output image second training block mode transcoding block mode used in the transcoding of a training macroblock training image pre-recorded image encoded in the first format used in the generation of the block mode conversion table transcoded training image image encoded in the second format obtained by transcoding a training image by using a codec device transcoding block mode indicates type (Intra or Inter) and size of partitions used for transcoding the output MB The embodiments of the invention are concerned with transcoding a sequence of input images into a sequence of output images. Examples of a sequence of input images and output images include an input video and an output video respectively. Each input and output image includes a number of macroblocks of pixels and is referred to as an input MB and output MB respectively. Each input MB and output MB has partitions and the encoding block mode indicates the type and a size of partitions within the input MB whereas the transcoding block mode indicates the type and the size of the partitions within the output MB.

The embodiments of the present invention exploit a decoded residual information, in addition to the encoding block modes and motion vectors (MV) information for the input MB gathered from the MPEG-4 decoding stage, to further improve MPEG-4 to H.264 transcoding performance in terms of speed and quality. As mentioned earlier, each input MB has partitions and each MV is associated with a partition within the input MB.

A general description of the method for efficient video transcoding according to the embodiment of the present invention is provided next. First, the number of H.264 candidate transcoding block modes is reduced by using the decoded MPEG-4 block modes in conjunction with a block mode conversion table of the embodiment of the invention, which is enriched with the residual and MV information. Then, the MVs for a set of candidate transcoding block modes are determined. The MVs for the input MB are only refined when required based on residual information. The sum of absolute difference (SAD) is evaluated for all candidate transcoding block modes and the optimal transcoding block mode is selected by using H.264 RDO.

The two steps of the method of the embodiment of the present invention corresponding to an offline and an online operation are illustrated in the flowchart 200 presented in FIG. 2. Upon start (box 202), the procedure 200 generates a block mode conversion table for producing sets of candidate transcoding block modes (box 204) used during the transcoding of the sequence of input images. This is followed by the online transcoding of the sequence of the input images in a first format into a sequence of output images in a second format (box 206). After the completion of this step, the procedure 200 exits (box 208). Please note that the step captured in box 204 is performed only once whereas the online transcoding (box 206) can performed multiple times on various sequences of input images.

The structure of a system for video transcoding according to the embodiment of the invention is described in more detail in FIG. 3(*a*). System 300 comprises two components: the block mode conversion table generator module 302 that performs the operations captured in box 204 of FIG. 2 and the online transcoding module 304 that performs the operations captured in box 206. The structure of the block mode conversion table generator module 302 is shown in FIG. 3(*b*) whereas the structure of the online transcoding module 304 is displayed in FIG. 7(*a*) that is presented later in this document.

The block mode conversion table generator module 302 includes a training image repository 310, a Codec device 312, and a conversion table generator module 314. The training image repository 310 stores training images that are used in the generation of the block mode conversion table. Each training image, encoded in the first format, comprises one or more training macroblocks of pixels. The codec 312 receives its inputs from the training image repository 310 and transcodes each training MB into a transcoded MB encoded in the second format. The output of the codec 312 is processed by the conversion table generator module 314 that includes a record generator module 316, and a record processor module 318. The record generator module 316 is responsible for generating a record for the transcoding of each training MB whereas the record processor module 318 processes the records generated during the transcoding of the training images. Further details regarding the information contained in the records and the operations performed by the different modules are explained in a later section that focuses on the description of the method deployed for the generation of the block mode conversion table.

The record processor module 318, in turn, includes a group handler module 320, a table maker module 322, a table storage module 324 and a computational means 326 for computing residual energy for the training MB. The group handler module 320 classifies records into groups whereas the table maker module 322 processes the output of the group handler module 320 producing the block mode conversion table. The table storage module 324 stores the block mode conversion table. The computational means 326 for computing residual energy for the training MB is used in the generation of the block mode conversion table.

FIG. 3(*c*) shows the table maker module 322 in more detail. The table maker module 322 comprises computational means 340 for creating the multi-tuple for each group in the block mode conversion table and computational means 342 for storing the first training block mode, the class identifier and the set of the second training block modes for the group. These computational means are used in the generation of the block mode conversion table. FIG. 3(*d*) shows the codec device 312 in more detail. The codec device 312 includes computational means 350 for extracting a motion vector (MV) for the training MB and generating a motion vector for the transcoded training MB that are used by the conversion table generator module 314.

The computational means 326, 340, 342 and 350 comprise computer readable code performing methods, procedures, functions or subroutines which are stored in a computer readable storage medium to be executed by a CPU.

Each of the systems of the embodiments of the invention shown in FIG. 3(*a*), FIG. 3(*b*), FIG. 3(*c*), FIG. 3(*d*), FIG. 6, FIG. 7(a), FIG. 7(b), FIG. 7(c) and FIG. 7(d) can include a general purpose or specialized computer having a CPU and a computer readable medium, e.g., memory, DVD, CD-ROM, floppy, magnetic tape or other storage medium, having computer readable instructions stored thereon for execution by the CPU. Alternatively, the system can be implemented in firmware, or combination of firmware and a specialized computer having a computer readable storage medium. The training image repository 310 module comprises computer readable data that is stored in a computer readable storage medium. The other components of the block mode conversion table generator module 302 that include modules 312, 314, 316, 318, 320 and 322 include a firmware or, alternatively, computer readable instructions stored in a computer readable storage medium for execution by a processor.

The procedure for construction of the block mode conversion table captured in box 204 of FIG. 2 is explained next. Before explaining the method for the construction of the block mode conversion table, a general description of the technique is presented first.

Current video compression standards use two key techniques: motion compensated predictive coding and transform coding. A sequence of images is often referred to as a sequence of frames in the video transcoding literature. Predictive coding reduces temporal redundancy between images by subtracting a predicted image, obtained from the ME process, from the image to encode in order to produce a prediction error image that is included in residual information for the image to encode. This residual information typically has significantly less energy than the original image and can therefore be encoded with fewer bits. The same observation holds for the residual information associated with an input MB in a sequence of input images being transcoded. The more accurate the prediction process is, the lesser energy will be contained in the residual information. Therefore, this information can be used as a measure of the efficiency of the ME process, including the suitability of the MV and the transcoding block mode (that indicates whether the right partition sizes are selected). In the following discussion, the first format used in encoding the sequence of input images is MPEG-4 whereas the second format used for encoding the sequence of output images is H.264. It should be noted that the same explanation holds for other examples of the first format that include H.263, H.264, MPEG-2 or MPEG-4 and of the second format that include H.263, H.264, MPEG-2 or MPEG-4. For instance, an H.264 video stream encoded with half-pixel accuracy may be transcoded to H.264 with quarter-pixel accuracy. The output format may be the same as the input format. Studying the cascade transcoding of MPEG-4 to H.264 led to the following observations, which are exploited in the block mode conversion table containing sets of candidate transcoding block modes (used in transcoding a sequence of input images encoded in MPEG-4 to a sequence of output images encoded in H.264).

- MPEG-4 macroblocks using 16×16 Inter mode are most often transcoded using either H.264 SKIP or 16×16 Inter modes. Indeed, if 8×8 block modes would have been better in H.264, then this block mode would most likely have been chosen for MPEG-4 too.
- MPEG-4 macroblocks using 16×16 Inter mode are most often transcoded using H.264 SKIP mode if the residual energy (defined in the following paragraph) is low and the MV is close to the predicted MV.
- MPEG-4 macroblocks using 16×16 Inter mode are most often transcoded by using a H.264 16×16 Inter block mode if the residual energy is high (but not so high that an Intra mode is preferable). MPEG-4 macroblocks using an Inter8×8 mode may be transcoded resulting in a variety of H.264 modes, including SKIP, 16×16, 16×8, 8×16 and 8×8 transcoding block modes. However, as described in the paper by B. G. Kim and S. K. Song, "Enhanced inter mode decision based on contextual prediction for P-slices in H.264/AVC video coding," ETRI journal, Vol. 28, Number 4. pp 425-434, August 2006, 8×4, 4×8, and 4×4 transcoding block modes are rarely used.
- MPEG-4 SKIP and 16×16Inter modes are used most often in video coding applications and have the most impact on computational complexity (although the 8×8 encoding block mode should not be ignored) (see the paper by Kim et al.).
- MPEG-4 Intra blocks represent a small percentage of all encoded blocks in a typical mobile video application, since key images are infrequent to maintain coding efficiency, and therefore have a small impact on computational complexity. This is discussed in the documentation in ISO/IEC 14496-10 AVC and ITU-T rec. H.264 described earlier.

We now present some definitions. Let I(x, y) and J(x, y) with $0 \leq x, y \leq 15$ be MBs of the original and predicted images respectively. Here, we consider only the luminance information. The residual information for the MB is defined as:

$$R(x, y) = I(x, y) - J(x, y), 0 \leq x, y \leq 15 \qquad (1)$$

The residual energy for the MB is defined as:

$$E = \sum_{x=0}^{15}\sum_{y=0}^{15} R^2(x, y) = \sum_{x=0}^{15}\sum_{y=0}^{15}[I(x, y) - J(x, y)]^2 \qquad (2)$$

It is often useful to determine the residual energy for each 8×8 block of an MB. Let us define $E_k$, the residual energy of a k-th 8×8 block of an MB, as follows:

$$E_k = \sum_{x=0}^{7}\sum_{y=0}^{7} R^2(x + p_{kx}, y + p_{ky}) \qquad (3)$$

with $p_k = [p_{kx}, p_{ky}]$ for $0 \leq i \leq 3$, where $p_0 = [0,0]$, $p_1 = [8,0]$, $p_2 = [0,8]$, and $p_3 = [8,8]$. Clearly, the residual energy E of an MB is the sum of the energies $E_k$ of the four 8×8 blocks, expressed as $$E = \sum_{k=0}^{3} E_k.$$

Please note that depending on the encoding (transcoding) block mode used, a partition within the input (output) MB may comprise one or more such 8×8 blocks. When a partition includes multiple 8×8 blocks, the residual energy for the partition is given by the sum of the residual energies of the constituent 8×8 blocks.

Extensive simulations were performed with Quarter Common Intermediate Format (QCIF) (176×144) and Common Intermediate Format (CIF) (352×288) videos at different bit rates with the cascade approach to analyze the probability distribution of mapping decisions from MPEG-4 information (including the encoding block modes, MVs, and residual energy for the input MB) to transcoding block modes for H.264. The test set included videos with various characteristics in terms of motion and details. Intel's video codecs for MPEG-4 and H.264 implementations were used. In order to classify MBs having low and high residual energy, two predetermined thresholds Thr_low and Thr_high are set empirically. The expectation is that if Thr_low is set properly, Input MBs encoded using the 16×16 Inter block mode with a residual energy below Thr_low and an MV similar to the predicted MV would be transcoded as SKIP with a very high probability, thereby eliminating the need to search for other candidate transcoding block modes. Similarly, if Thr_high is set properly, input MBs with a residual energy above Thr_high would be transcoded by using an Inter16×16 transcoding block mode with a very high probability. We have limited this strategy to input MBs with 16×16 Inter encoding block modes, since they represent the highest percentage of MPEG-4 block modes for most mobile videos, and this alone has brought important performance improvements. However, the concept of partitioning based on residual energy can be extended to Input MBs encoded using an 8×8 block mode. The thresholds have been set to {Thr_low=125, Thr_high=5000} through careful analysis and comparison of hundreds of simulations.

The observations summarized earlier were used in the construction of a block mode conversion table. Please note that such a block mode conversion table containing sets of candidate block modes can be generated for other videos, other first and second formats as well as other threshold values.

Figure 4:
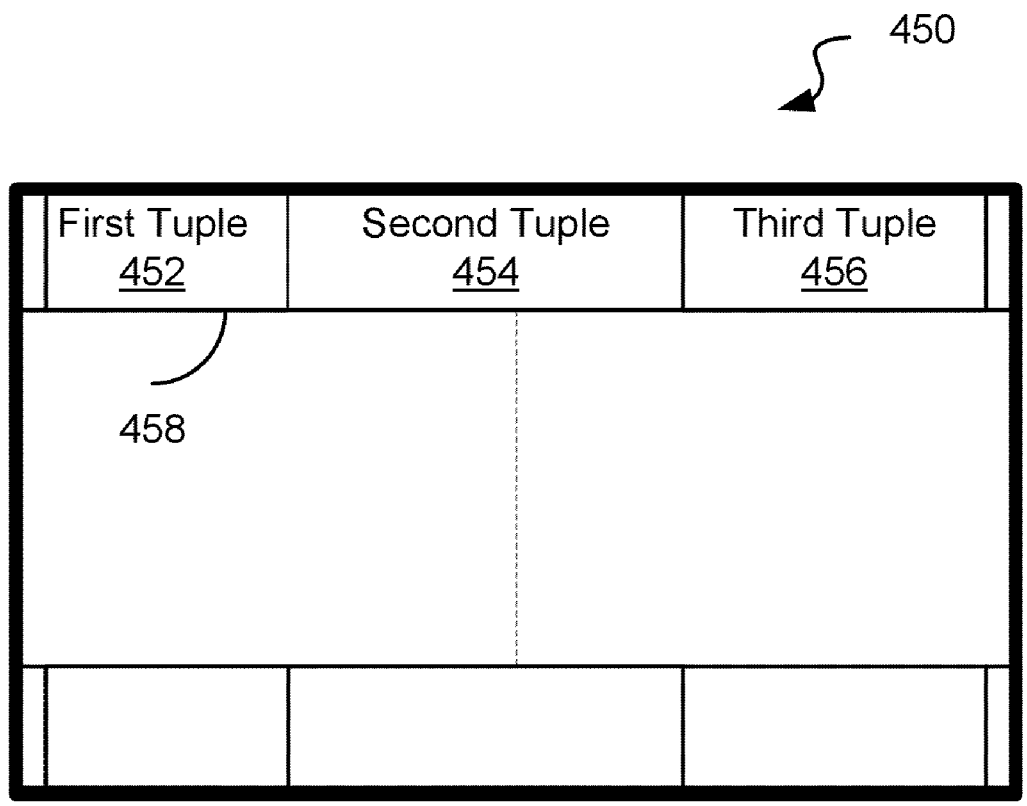
FIG. 4(a) shows an example table containing transcoding statistics for a sample video used by the embodiments of the invention.
FIG. 4(b) shows the structure of a block mode conversion table.

Table 400 displayed in FIG. 4(a) shows results obtained for the transcoding of the QCIF Carphone video sequence. This sequence was initially encoded in MPEG-4 VSP at 200 kbit/s and then re-encoded in H.264 baseline at 128 kbit/s. Although specific values vary with each video sequence and bitrate, the distribution among block modes remains mostly the same. Please note that the header "MPEG-4 Coding modes" corresponds to the encoding block mode used for the training MBs whereas the header "H.264 coding modes" corresponds to the transcoding block modes used in the transcoding. Please note that the MPEG-4 block modes used in the following list correspond to the encoding block modes for the training MBs in the training images.

- Intrad: MPEG-4 Intra training MBs from an Intra frame. It can be observed that they tend to be re-encoded in Intra mode.
- Intra-P: MPEG-4 Intra training MBs from an Inter frame. It can be observed that they tend to be re-encoded in SKIP or Inter16×16 modes.
- Inter16×16_case1: MPEG-4 Inter16×16 MB satisfying the following constraints on residual energy and motion vectors:

$E<Thr\_low, |V_x-Vp_x|\leq 1$ and $|V_y-Vp_y|\leq 1$, where $V=[V_x,V_y]$ is the decoded MPEG-4 MV and $Vp=[Vp_x, Vp_y]$ is the predicted MV from the H.264 encoding stage. The training MB (or the input MB that is transcoded during the online transcoding) in this situation has low residual energy E and motion vectors are close to the predicted motion vectors (small $V_x-Vp_x$ and $V_y-Vp_y$). It can be observed that, as expected, this type of training MB tends to be re-encoded as SKIP most of the time.
- Inter16×16_case2: MPEG-4 Inter16×16 training MB satisfying the following constraints on residual energy and motion vectors:

$Thr\_low \leq E \leq Thr\_high$ or $E<Thr\_low$ with $|V_x''Vp_x|>1$ or $|V_y-Vp_y|>1$ This type of MBs tends to be transcoded by using a SKIP or Inter16×16 block mode most of the time.
- Inter16×16_case3: an MPEG-4 Inter16×16 training MB satisfying the following constraint on residual energy:

$E>Thr\_high$

This type of training MBs tends to be transcoded by using an Inter16×16 block mode most of the time.
- Inter8×8: Although MPEG-4 Inter8×8 training MBs are often transcoded by using an Inter16×16 block mode, the remaining half of the time transcoding is performed by using several modes with comparable probability. However, partitions smaller than 8×8 are not highly probable and could be ignored. This is likely due to the Intel H.264 encoder's behaviour.
- SKIP: MPEG-4 SKIP training MBs are usually transcoded using SKIP.

The values under sb8×8, sb8×4, sb4×8, and sb4×4 in the last four columns of Table 400, are respectively the mapping percentages of the sub-blocks 8×8, 8×4, 4×8, and 4×4 with respect to the Inter8×8 block mode. Please note that 8×8 that corresponds to the boundary case between a block and a sub-block in Table 400. An Inter8×8 block, may be broken into smaller parts. If it remains 8×8 then the sub-mode of the Inter8×8 mode is sb8×8; otherwise it can comprise smaller partitions such as 8×4, 4×8 and 4×4 leading to the corresponding sub-block modes.

Table 400 also shows the distribution of each type of training MB with respect to the Intra and Inter modes. For instance, 91% of MPEG-4 Intra training MBs are Intra-I, while 9% are Intra-P. For MPEG-4 non Intra training MBs, 17% are Inter16×16_case1, 37% are Inter16×16_case2, 10% are Inter16×16_case3, 25% are Inter8×8, and 11% a SKIP. In Table 400, the probabilities in bold represent cases with high probabilities. The preferred embodiment of the invention limits the set of H.264 candidate block modes to the ones associated with these bold values. Please note that the embodiment of the invention allows this set of candidate block modes to be chosen differently leading to a different trade off between speed of transcoding and image quality. Based on the results captured in Table 400, a block mode conversion table is generated. This table contains the sets of H.264 candidate block modes as a function of the various (MPEG-4) input block mode categories:

- Intrad: The set of candidate transcoding block modes includes Intra16×16 and Intra4×4.
- Intra-P: The set of candidate transcoding block modes includes Inter16×16.
- Inter16×16_case1: The set of candidate transcoding block modes includes SKIP.
- Inter16×16_case2: The set of candidate transcoding block modes includes SKIP and Inter16×16.
- Inter16×16_case3: The set of candidate transcoding block modes includes Inter16×16.
- Inter8×8: The set of candidate transcoding block modes includes SKIP, Inter16×16, Inter16×8, Inter8×16, Inter8×8.
- SKIP: The set of candidate transcoding block modes includes SKIP.

As discussed earlier and as shown in diagram 450 of FIG. 4(b), the block mode conversion table contains multi-tuples. Each multi-tuple 458 comprises a first tuple 452 (also referred to as one tuple), a second tuple 454 (also referred to as yet another tuple) and a third tuple 456 (also referred to as another tuple). The first tuple 452 in each multi-tuple 458 includes a first training block mode for a sub-set of the training MBs encoded using the first training block mode (e.g. the Intrad block mode), the second tuple 454 includes the corresponding list of candidate transcoding block modes (e.g. Intra16×16 and Intra4×4) and the third tuple 456 includes an image class identifier (e.g. case1) identifying those MBs in the sub-set, whose residual information satisfies a predetermined set of constraints. The pre-determined set of constraints includes constraints regarding MVs and residual energy. Please note that the list of transcoding block modes in the second tuple 454 contains the transcoding block modes used by the codec device in transcoding the macroblocks identified by the first tuple 452 and the third tuple 456. Case1, case2 and case3 described earlier are examples of image class identifiers. Certain multi-tuples such as the ones that correspond to the first two bullets in the list presented above have a null entry in their third tuples.

As expected, the block mode conversion table significantly reduces the number of candidate transcoding block modes in comparison to previous prior art methods discussed in the paper by Lee et al. and the paper by Liang et al. described earlier, where four candidate modes are typically tested.

Figure 5A:
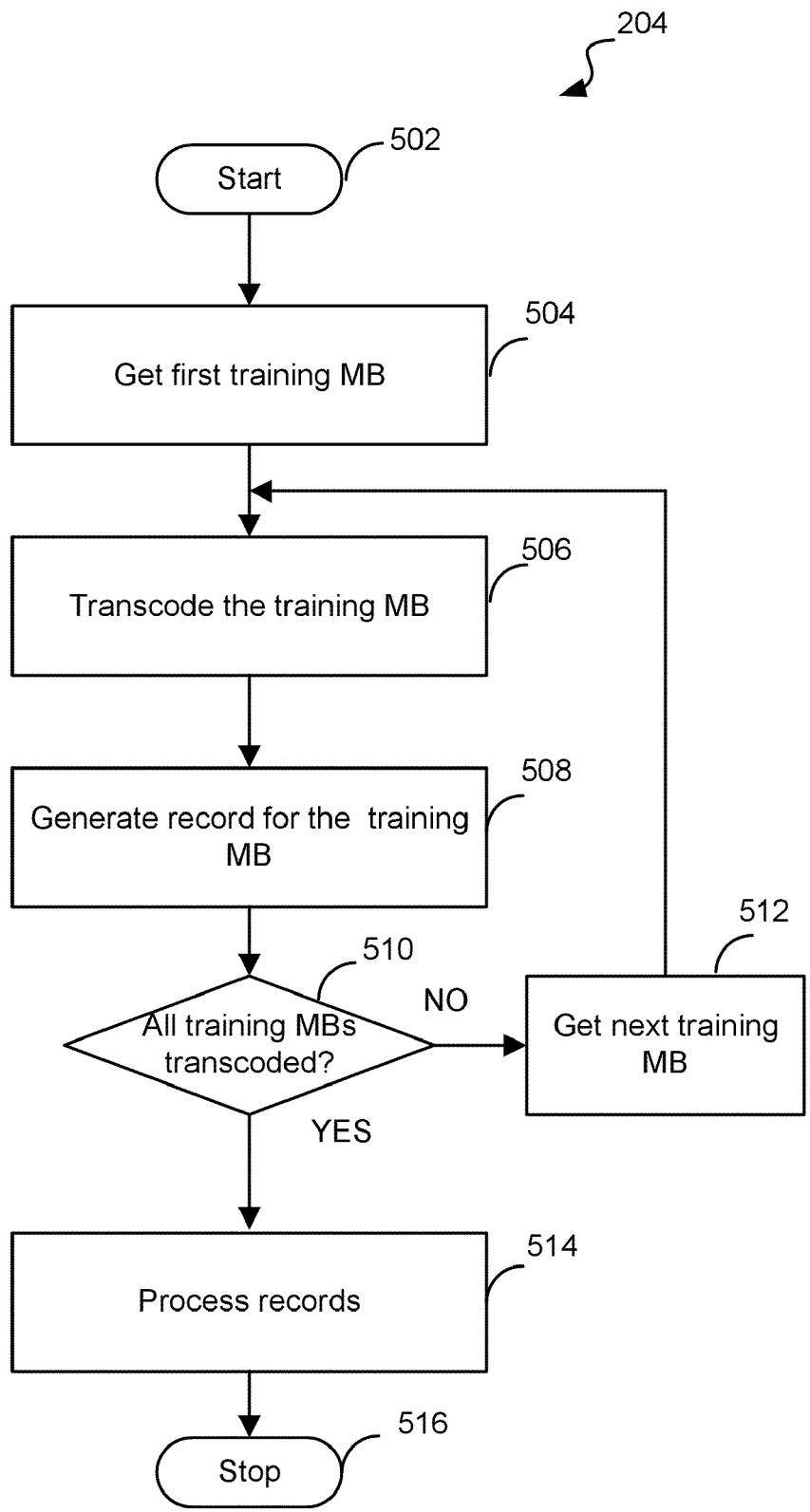
FIG. 5(a) shows a flowchart for illustrating "Generate block mode conversion table" (box 204) of FIG. 2 in more detail.
Figure 5B:
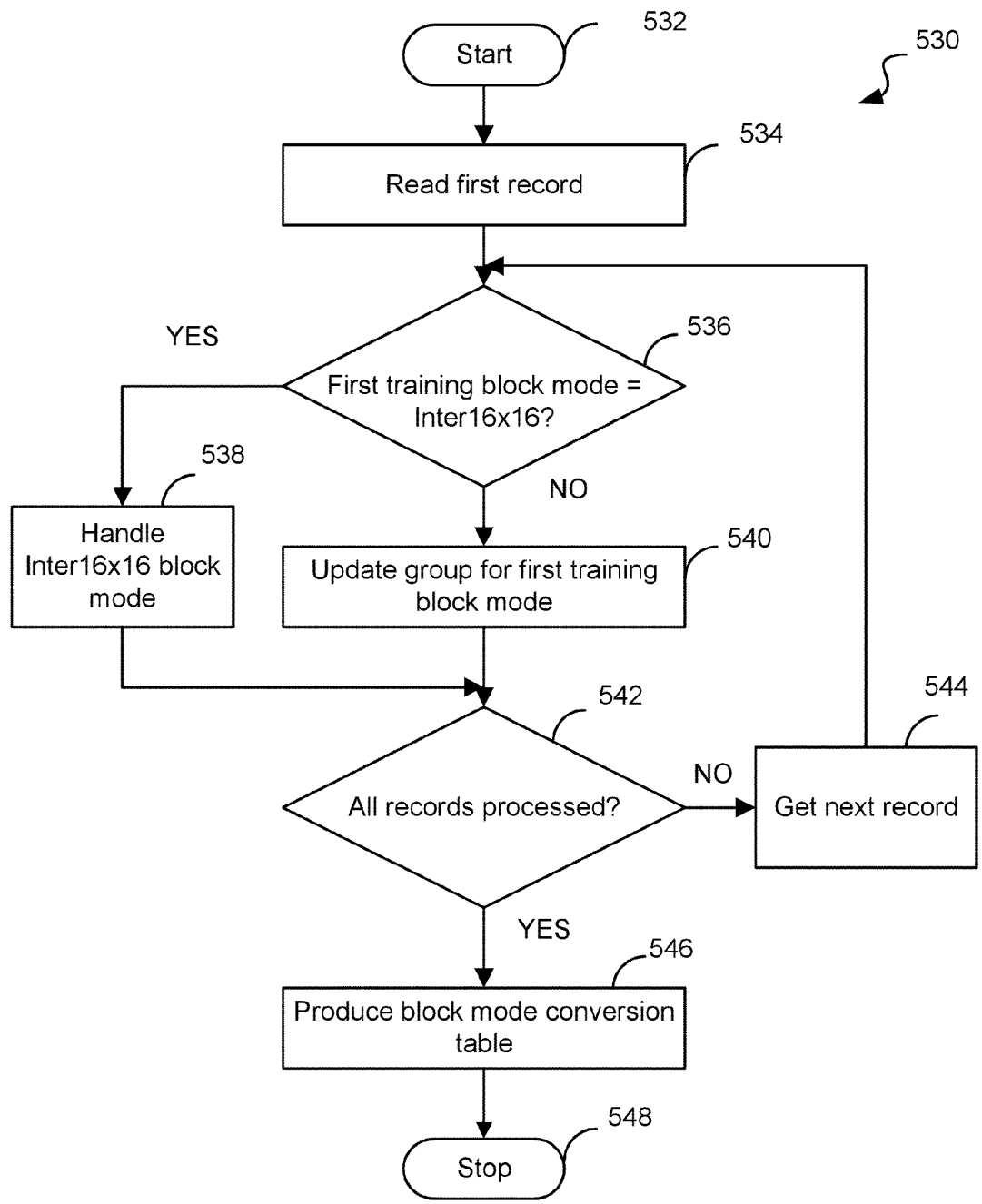
FIG. 5(b) presents a flowchart for illustrating the step "Process records" (box 514) of FIG. 5(a) in more detail.
Figure 5C:
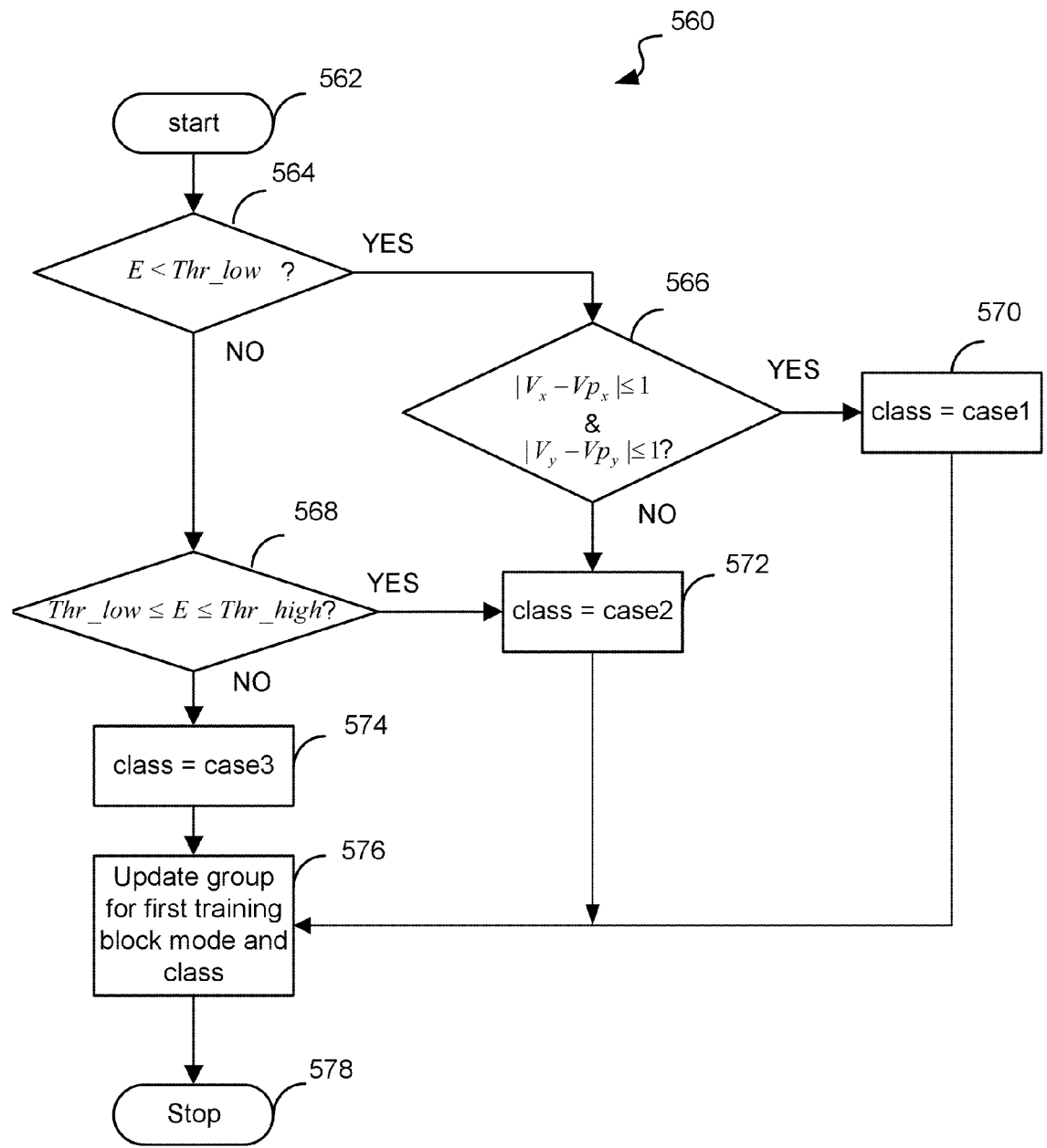
FIG. 5(c) presents a flowchart for illustrating the step "Handle Inter16×16 block mode" (box 538) of FIG. 5(b) in more detail.

The step "Generate block mode conversion table" (box 204) of flowchart 200 presented in FIG. 2 is explained with the help of flowchart 204 displayed in FIG. 5(*a*). A sequence of training images each training image comprising one or more training MBs of pixels is used. Examples of such a sequence of training images include QCIF and CIF videos. Each training MB is then transcoded by a codec device into a transcoded training MB encoded in the second format. Information that includes residual information for the training MBs are captured for generating the block mode conversion table. Upon start (box 502), the procedure 204 gets the first training MB (box 504) and transcodes the training MB into a transcoded training MB (box 506). A record for this training MB is then generated (box 508). This record includes the first training block mode and the second training block mode used in the encoding of the training MB and the transcoded training MB respectively. As noted earlier, the encoding block for a given MB indicates the size of the partitions within the MB. In the next step, the procedure 204 checks whether or not all training MBs are transcoded (box 510). If so, the procedure 204 exits 'YES' from box 510, processes the records for generating the block mode conversion table (step 514) and exits (box 516). Otherwise, the procedure 204 gets the next training MB and loops back to the entry of box 506.

The step "Process records" (box 514) of the flowchart 204 displayed in FIG. 5(*a*) is explained with the help of flowchart 530 presented in FIG. 5(*b*) performing classification of records into different groups. Each group is characterized by the first training block mode and a class identifier that is based on the residual information and the motion vectors for the training MB. Information regarding the group includes the first training block mode, the class identifier and information regarding the various second training block mode used by the codec device in transcoding the training MBs that belong to this group. Upon start (box 532), the procedure 530 reads the first record (step 534) and checks whether the first training block mode included in the record is Inter16×16 (box 536). If so, the procedure 204 exits 'YES' from box 536, performs operations necessary for handling the Inter16×16 block mode (box 538) that include the determination of the class of the group and proceeds to the input of box 542. Otherwise, the procedure 530 exits 'NO' from box 536, updates the group corresponding to the first training block mode (box 540) and checks whether or not all records are processed (box 542). If so, the procedure 530 exits 'YES' from box 542, produces the block mode conversion table (box 546) and exits (box 548). Otherwise, the procedure 530 gets the next record (box 544) and loops back to the entry of box 536.

The step "Handle Inter16×16 block mode" (box 538) of flowchart 530 is explained further with the help of flowchart 560 displayed in FIG. 5(*c*). Upon start (box 562), the procedure checks whether or not the residual energy E for the training MB is lower than Thr_low (box 564). If so, the procedure 560 exits 'YES' from 564 and checks whether the constraints $|V_{x}-V_{px}|\leq 1$ and $|V_{y}-V_{py}|\leq 1$ are satisfied (box 566). If so, the procedure 560 exits 'YES' from box 566, sets class to case1 (box 570), updates the information for the group corresponding to a first training block mode of inter16× 16 and class (box 576) and exits (box 578). Otherwise, the procedure exits 'NO' from box 566 sets class to case2 (box 572) and proceeds to the input of box 576. If the condition tested in box 564 is false, the procedure 560 exits 'NO' from box 564 and checks whether or not the constraint Thr_low$\leq$E$\leq$Thr_high is satisfied (box 568). If so, the procedure 560 exits 'YES" from box 568, sets class to case2 and proceeds to the input of box 576. Otherwise, the procedure 560 exits 'NO' from box 568, sets class to case3 and proceeds to the entry of box 576 to update the information for the corresponding group and exits (box 578).

The operations performed within the box 576 are explained next. As mentioned earlier, each group is characterized by a first training block mode and class. For all the first training block modes other than Inter16×16, the class identifier is null. For Inter16×16 there are three classes: case1, case2 and case3. Whether or not a record belongs to a particular group is based on the respective conditions regarding the residual information (residual energy) and the motion vectors for the training MB are met. This is explained in the flowchart 560 discussed earlier. The frequency of use for each second training block mode in this group is computed. The second training block modes the frequency of usage of which is above a predetermined usage threshold are included in the block mode conversion table to be used as the set of candidate block modes for this group.

In the preferred embodiment the block mode conversion table comprises multi-tuples. A multi-tuple 458 is created for each group. The first tuple 452 and the third tuple 456 include respectively the first training block mode and the class identifier characterizing the block and the second tuple 454 includes the set of candidate block modes explained in the previous paragraph. During the online operations, the encoding block mode and the residual information for the input MB are matched with the contents of the first and the third tuples. The contents of the second tuple 454 that corresponds to the matched first and third tuples are used as a set of candidate transcoding block modes. A detailed description of how the block mode conversion table is used during the online transcoding is included in a later part of the document. In an alternate embodiment the block mode conversion table may comprise a set of two-tuples each first tuple including an encoding block mode for the input MB and the corresponding second tuple including a list of predetermined transcoding block modes corresponding to the encoding block mode included in the first tuple.

The online transcoding of the sequence of input images in the first format into a sequence of output images in the second format is described next.

Figure 6:
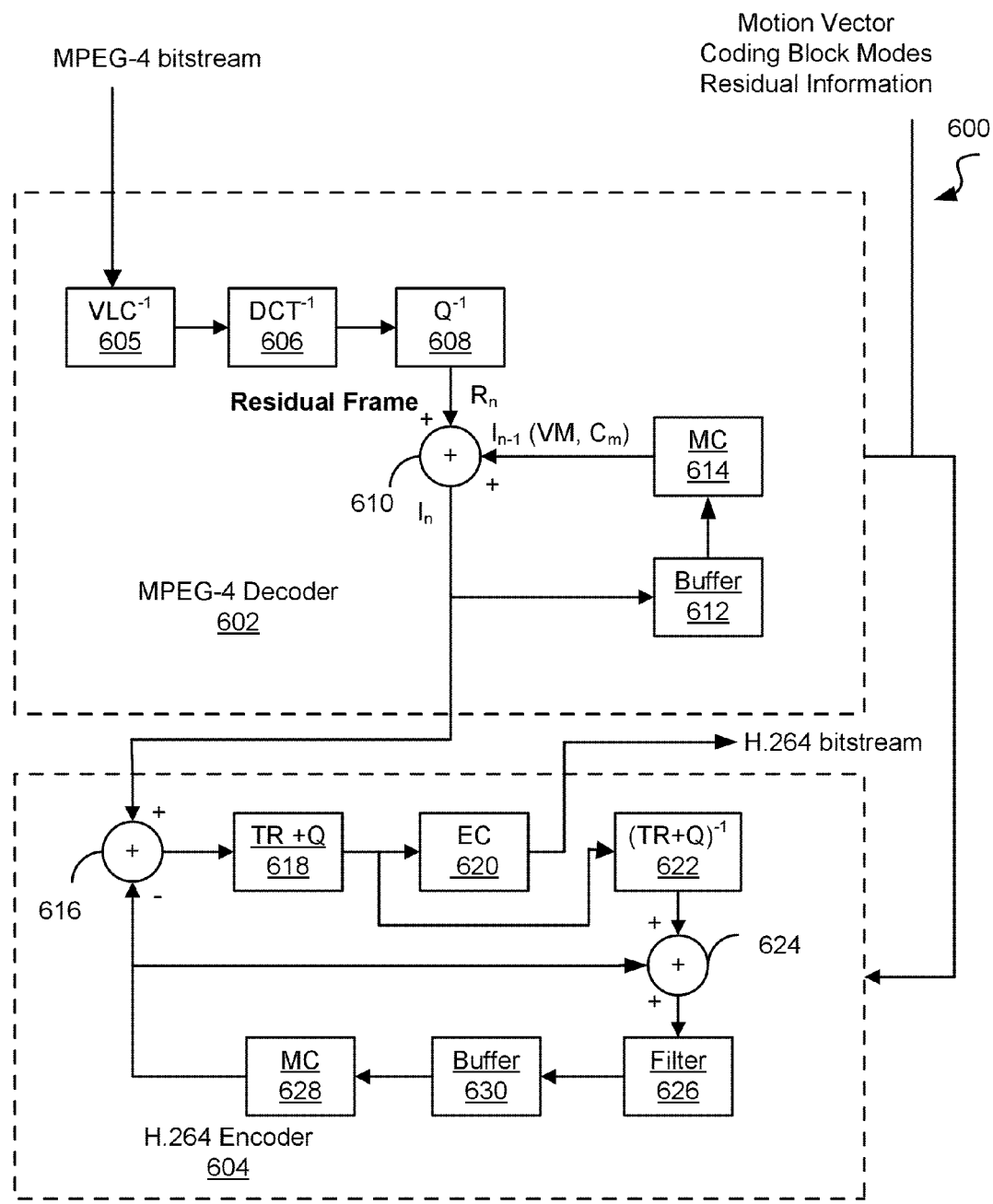
FIG. 6 shows a system for fast MPEG-4 to H.264 transcoding of a sequence of input images into a sequence of output images according to the embodiment of the invention.

FIG. 6 shows a system for fast MPEG-4 to H.264 transcoding of a sequence of input images into a sequence of output images according to the embodiment of the invention, reusing MPEG-4 encoding block modes, motion vectors, and residual information for input MBs. As discussed earlier, the system can be used for handling other first and second formats as well. The architecture of the system 600 is a cascaded architecture including an MPEG-4 Decoder 602, the output of which is connected to the input of an H.264 Encoder 604. Residual information, motion vectors and encoding block modes for the input MBs in the sequence of input images are extracted by the MPEG-4 Decoder 602 and reused in the H.264 Encoder 604 to speed up the transcoding process. The MPEG-4 Decoder 602 is described first followed by the H.264 Encoder 604.

In the MPEG4 Decoder 602, the output of $VLC^{-1}$ unit 605 is connected to the input of $DCT^{-1}$ unit 606, the output of which is connected to the input of $Q^{-1}$ unit 608. The output of $Q^{-1}$ unit 608 is connected to the input of Adder 610 the output of which is connected to the input of H.264 Encoder 604. The output of Adder 610 is also connected to the input of Buffer 612 the output of which is connected to the input of MC unit 614. The output of MC unit 614 is connected to the input of Adder 610. The MPEG4 Decoder 602 that receives an MPEG-4 bitstream as input first applies an inverse variable length coding (VLC) operation, through the $VLC^{-1}$ unit 605. It is the inverse operation of the VLC operation used in an MPEG-4 encoder. Huffman or arithmetic coding is often used for this operation. VLC represents a lossless compression technique. The output of the $VLC^{-1}$ unit 605 is connected to the input of $DCT^{-1}$ unit 606 that performs an inverse Discrete Cosine Transform (DCT). The output of $DCT^{-1}$ unit 606 is connected to the input of a $Q^{-1}$ unit 608 for performing an inverse Quantization (Q) operation. These operations are respectively the inverse process of the DCT and the Q operations performed in the MPEG-4 encoder. Their role is to apply the inverse process of the DCT and the Q performed in the MPEG-4 encoder to reconstruct the residual frame ($R_n$, for a non-Intra frame) or the original video frame (for an Intra frame). The role of Buffer 612 is to store frames, so we can have the past frame and then apply Motion Compensation (MC) through MC unit 614 and add the result to the residual ($R_n$) to reconstruct the video frame. The output of $Q^{-1}$ unit 608 is thus connected to the input of Adder 610 another input of which is connected to the output of MC unit 614 that uses the transmitted motion vectors and the frame in Buffer 612 to create the associated predicted frame. The output of the Adder 610 is connected to the input of Buffer 612 and also forms the output of MPEG-4 Decoder 602. The output corresponding to each Input MB is a decoded input MB that is presented as an input to the H.264 Encoder. The decoded input MB represents decoded pixels of the image within the region associated with the MB.

The H.264 Encoder 604 is a video encoder that uses the redundancy between intra and inter frames through motion compensated predictive coding and applies other efficient coding techniques such as transform coding and variable length coding (Context-adaptive variable-length coding (CAVLC) or Context-based adaptive binary arithmetic coding(CABAC)). In the H.264 Encoder 604, the output of Adder 616 is connected to the input of TR+Q unit 618, the output of which is connected to the input of EC unit 620 and the input of $(TR+Q)^{-1}$ unit 622. The output of $(TR+Q)^{-1}$ unit 622 is connected to the input of Adder 624, another input of which is connected to the output of MC unit 628. The output of Adder 624 is connected to the input of Filter unit 626 the output of which is connected to the input of Buffer 630. The output of Buffer 630 is connected to the input of MC unit 628, the output of which is connected to the input of Adder 616. H.264 Encoder 604 uses a feedback loop the components of which are described next.

The input of the H.264 Encoder goes to one input of Adder 616. The other input of the Adder 616 is connected to the output of MC unit 628. The output of Adder 616 is connected to the input of TR+Q unit 618 that performs a frequency transform combined with the quantification process. This is a lossy process and the frequency transform's role is to separate high frequencies (details of the image) from low frequencies (general shape of the image), to quantize the frequencies in images. This leads to a better image quality given a number of available bits for encoding compared to quantizing pixels. The output of TR+Q unit 618 is connected to the input of a EC unit 620 and the input of $(TR+Q)^{-1}$ unit 622. The EC unit 620 that produces the output H.264 bitstream performs Entropy Coding (EC) that is a lossless compression process. Its role is to reduce the length of the bitstream by removing statistical redundancies still present in the image. The $(TR+Q)^{-1}$ unit 622 performs an inverse process of TR+Q, in order to reconstruct the current frame that will be used in the estimation and compensation process for reducing the inter redundancy of the next frame. The output of $(TR+Q)^{-1}$ unit 622 is connected to one input of Adder 624 the other input of which is connected to the output of MC unit 628. The output of Adder 624 is connected to the input of Filter unit 626. The role of Filter unit 626 is to reduce noise in the image and also reduce the artifacts due to the segmentation of the image into macroblocks (i.e. to remove blocking artifacts). The output of Filter unit 626 is connected to the input of Buffer 630 that stores reconstructed frames so that they can later be accessed for performing motion compensation. The output of Buffer 630 is thus connected to the input of MC unit 628 the output of which is fed back to the input of Adder 616 and the input of Adder 624. In the system 600, the MC unit 628 reuses the motion vectors from the MPEG-4 Decoder 602. The motion vectors, encoding block modes, and the residual information for the Input MBs and the frame in the buffer are used by the MC unit 628 to create the associated predicted frame. The way this information is used by the embodiments of the invention is explained next.

Figure 7A:
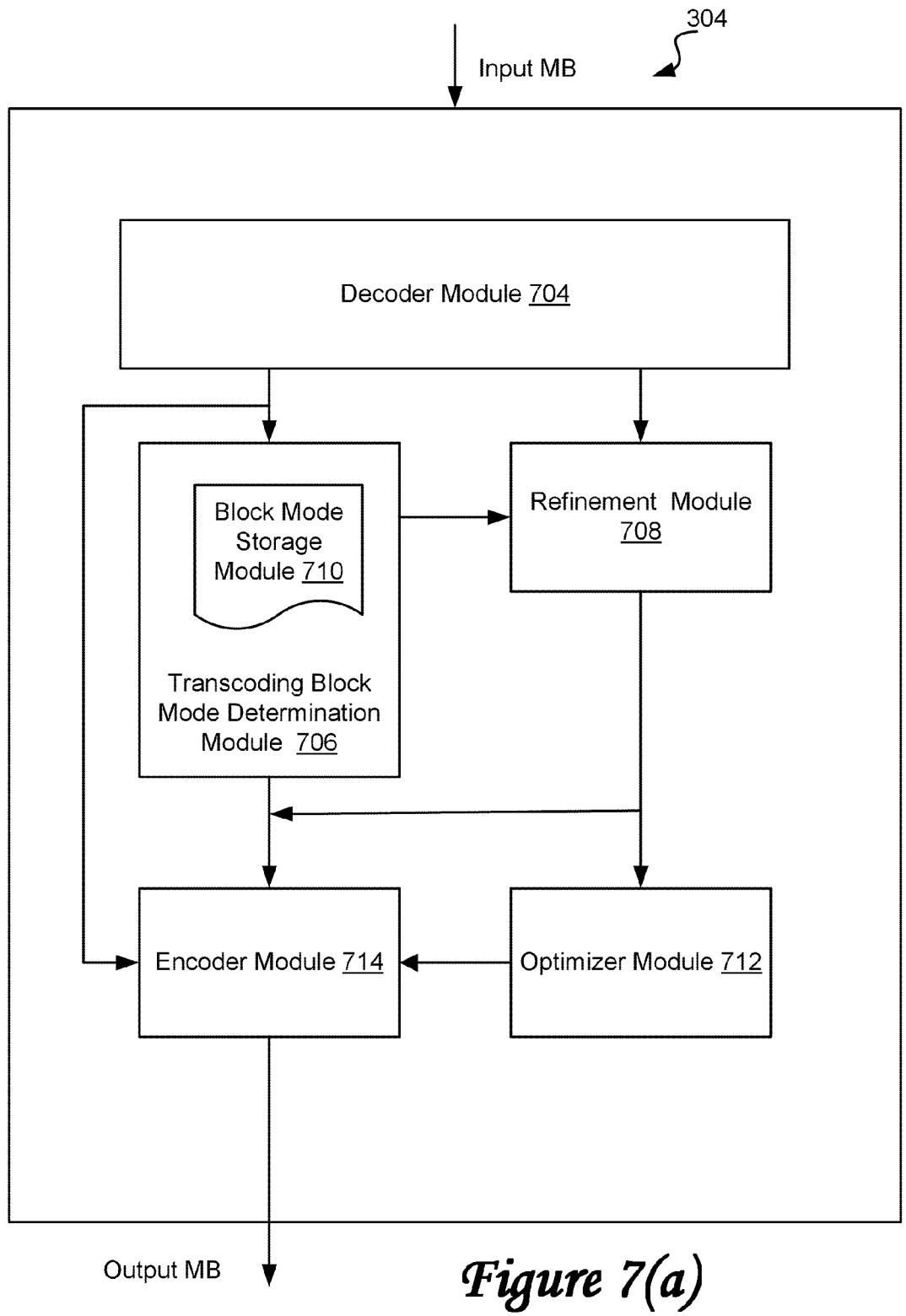
FIG. 7(a) shows the online transcoding module 304 of FIG. 3a in more detail.
Figure 7B:
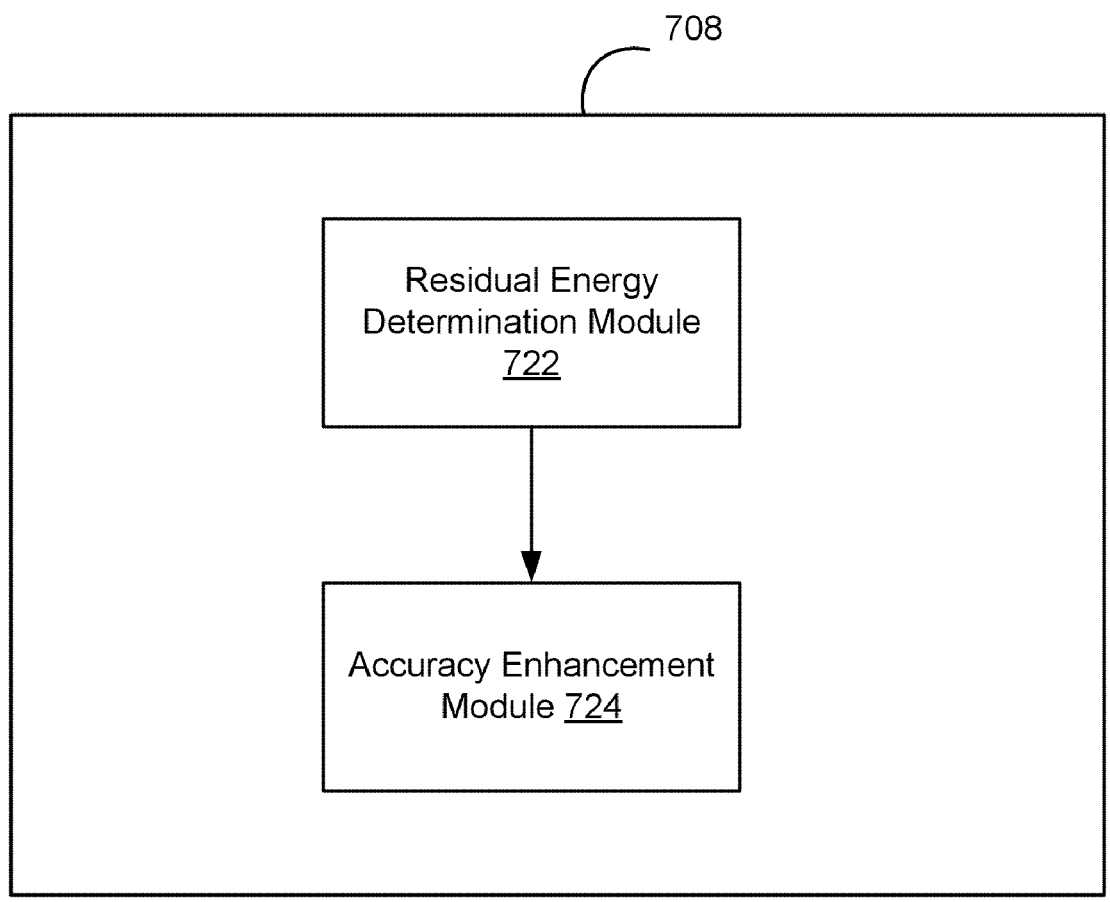
FIG. 7(b) shows the refinement module 708 in more detail.
Figure 7C:
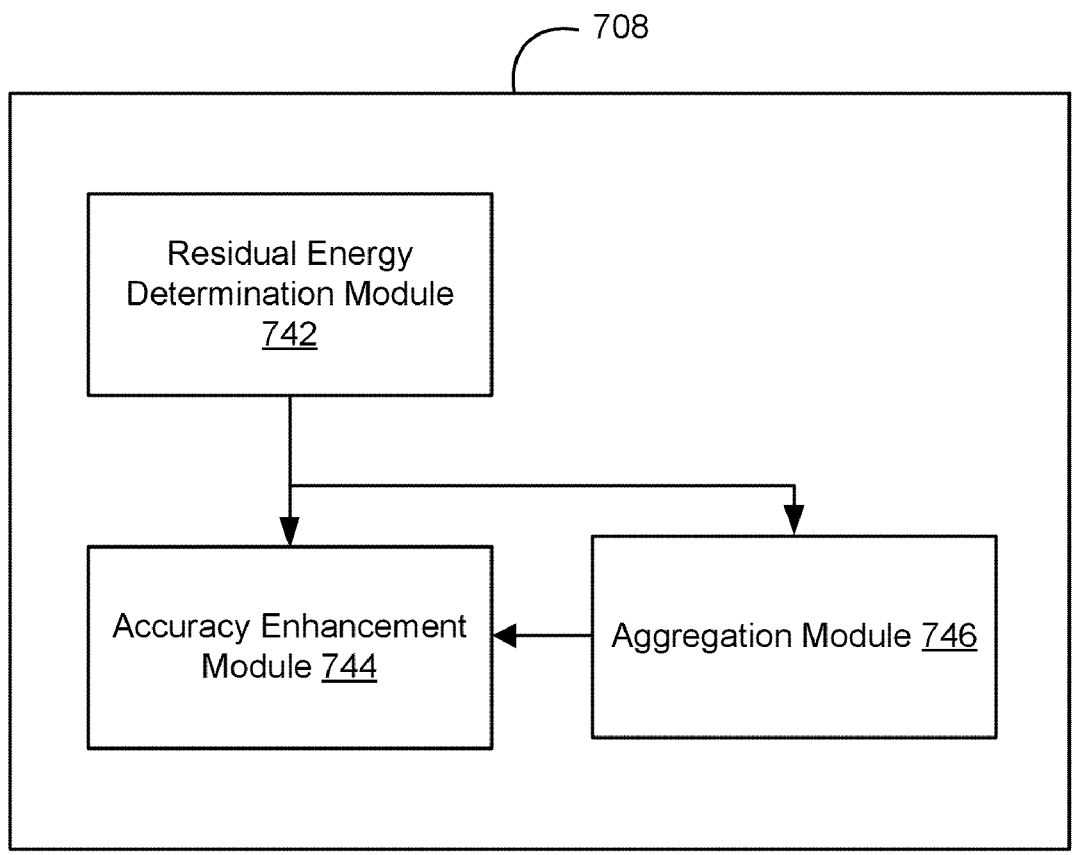
FIG. 7(c) presents an alternative implementation of the refinement module 708.
Figure 7D:
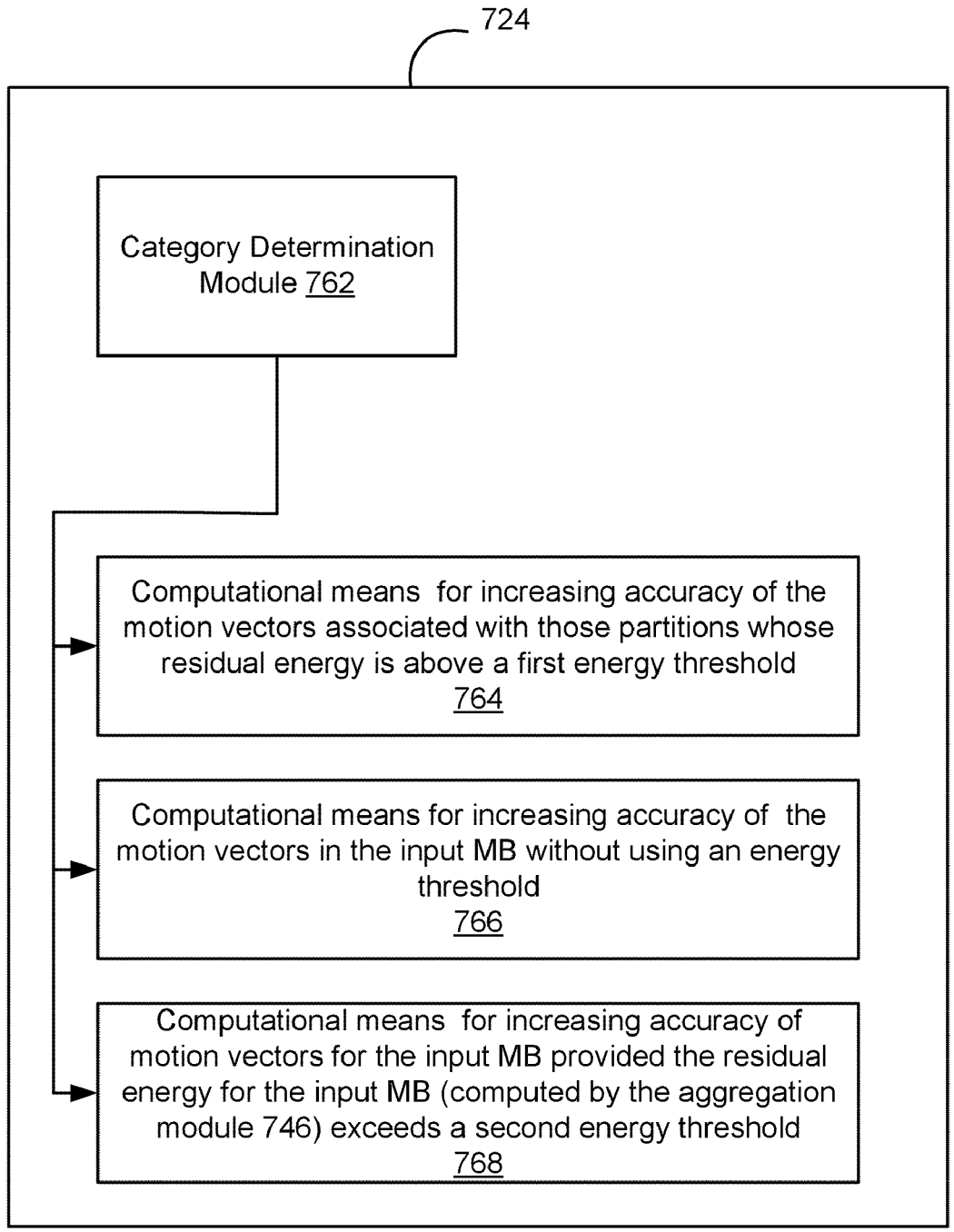
FIG. 7(d) shows the accuracy enhancement module 724 in more detail.

The structure of the online transcoding module 304 is shown in more detail in FIG. 7(a). Please note that FIG. 7(a) illustrates the online transcoding module 304 that can handle various first and second formats whereas FIG. 6 concerns the transcoding of input MBs encoded in MPEG-4 to output MBs encoded in H.264. The online transcoding module 304 comprises a decoder module 704, a transcoding block mode determination module 706, a refinement module 708, an encoder module 714 and an Optimizer module 712. The decoder module 704 takes an input MB as input and generates a decoded input MB, extracts an encoding block mode for the input MB, a motion vector associated with each partition within the input MB, and residual information for the input MB. The residual information and the encoding block mode generated by the decoder module 704 are processed by the transcoding block mode determination module 706 that includes a block mode storage module 710. When the first format is MPEG-4 and the second format is H.264, the decoder module 704 behaves in a similar fashion as the MPEG-4 Decoder 602 of FIG. 6. The transcoding block mode determination module 706 produces a set of candidate transcoding block modes for transcoding the input MB into the output MB using information stored in the block mode storage module 710. In the preferred embodiment the block mode storage module 710 contains the block mode conversion table discussed earlier. In an alternate embodiment it contains a list of all transcoding block modes capable of transcoding the input MB into the output MB. As described earlier, the block mode conversion table contains multi-tuples. Please note that the table includes all possible encoding block modes available in the first format and the corresponding predetermined candidate transcoding block modes that can be used for transcoding the input MB into the second format.

The refinement module 708 uses the set of candidate transcoding block modes provided by the transcoding block mode generation module 706 and the motion vectors produced by the decoder module 704. For each candidate transcoding block mode in the set, the refinement module 708 improves accuracy of the motion vectors for the input MB, using the residual information for the input MB to produce motion vectors for each candidate transcoding block mode. These motion vectors produced by the refinement module 708 are then used by the optimizer module 712 to select an optimal transcoding block mode, in such a way that a given characteristic of the output MB is optimized. The encoder module 714 encodes the decoded input MB into the output MB by using the optimal transcoding block mode determined by the optimizer module 712 and corresponding motion vectors for the optimal transcoding block mode generated by the refinement module 708. The output of the encoder module 714 is the output MB. In an alternative embodiment, existing motion vectors are used during optimization to select the best transcoding block mode and the corresponding MV is refined subsequently. This leads to a faster transcoding at the cost of lower image quality. This alternate embodiment should thus be used in a scenario in which speed of transcoding is more important than image quality.

The structure of the refinement module 708 is described with the help of FIG. 7(*b*). The refinement module 708 includes a residual energy determination module 722 and an accuracy enhancement module 724. The residual energy determination module 722 determines residual energy for each partition within the input MB by using respective residual information for the partition. When a partition comprises multiple 8×8 blocks, the residual energy for the partition is the sum of the residual energy for each constituent 8×8 block. In the preferred embodiment, the accuracy enhancement module 724 uses the output of the residual energy determination module 722 for increasing the accuracy of the motion vectors associated with those partitions within the input MB. In an alternate embodiment of the refinement module 708 includes an additional aggregation module 746 (see FIG. 7(*c*)). The aggregation module 746 determines the residual energy for the input MB as a function of residual energies for respective partitions within the input MB. The accuracy enhancement module 744 in this embodiment is different from that in the preferred embodiment because it uses the output of the aggregation module 746.

The accuracy enhancement module 724 module in turn includes a category determination module 762 and computational means (see FIG. 7(*d*)). The category determination module 762 determines a category for the input MB. The categories include first and second categories, each of which corresponds to the extracted encoding block mode for the input MB belonging to a specific predetermined set of encoding block modes. The first category corresponds to a first, and the second category corresponds to a second set of encoding block modes. The computational means 764, 766 and 768 comprise computer readable code performing methods, procedures, functions or subroutines which are stored in a computer readable storage medium to be executed by a CPU. With the input MB in the first category, for transcoding block modes belonging to a predetermined first list of transcoding block modes, the preferred embodiment uses the computational means 764 for increasing accuracy of the motion vectors associated with those partitions whose residual energy is above a first energy threshold. With the input MB in a first category, for transcoding block modes belonging to a predetermined second list of transcoding block modes, the preferred embodiment uses the computational means 766 for increasing accuracy of motion vectors in the input MB without using an energy threshold. The motion vectors handled by the computational means 766 include the best motion vector associated with each partition within the input MB. With the input MB in the second category, the preferred embodiment uses the computational means 768 for increasing accuracy of motion vectors for the input MB provided the residual energy for the input MB (computed by the aggregation module 746) exceeds a second energy threshold.

In an alternative embodiment, the input MBs in the first category are handled differently. With the input MB in the first category, computational means 764 increases the accuracy of the motion vectors associated with those partitions whose residual energy is above the first energy threshold whereas with the input MB in the second category, computational means 768 increases accuracy of all the motion vectors for the input MB provided the residual energy for the input MB is above the second energy threshold. Selection of the first and second energy thresholds are discussed later in this document.

As noted earlier, each of the systems of the embodiments of the invention shown in FIG. 7(*a*), FIG. 7(*b*), FIG. 7(*c*) and FIG. 7(*d*) includes a general purpose or specialized computer having a CPU and a computer readable medium, e.g., memory, DVD, CD-ROM, floppy, magnetic tape or other storage medium, having computer readable instructions stored thereon for execution by the CPU. Alternatively, the system can be implemented in firmware, or combination of firmware and a specialized computer having a computer readable storage medium. The storage module comprises computer readable data that is stored in a computer readable storage medium. All the modules of the online transcoding module 304, that include modules 704, 706, 708, 712, 714, the components of module 708: modules 722 and 724, the components of modules 724: modules 762, 764, 766 and 768, as well as the components of module 708: module 742, 744 and 746 include a firmware or, alternatively, computer readable instructions stored in a computer readable storage medium for execution by a processor.

Selectively enhancing the accuracy of the MVs for an input MB is an important operation performed by the embodiments of the invention and is discussed next. Motion estimation that is an important component of transcoding is a very computationally intensive operation. In order to reduce the computation burden, state-of-the-art transcoding algorithms reuse the decoded MPEG-4 MVs as much as possible. However, the compression performance of an encoder highly depends on the MVs. A change in MV accuracy from quarter to half pixel can increase the video quality by ~2 dB, depending on the video type. In the H.264 standard, the MVs are at quarter-pixel accuracy, while in the MPEG-4 standard they can be at quarter-pixel or half-pixel accuracy, depending of the profile supported: half-pixel for the visual simple profile (VSP) and quarter-pixel for the advanced simple profile. In this invention, we consider the VSP supported by most MPEG-4 mobile applications described in the 3GPP/3GPP2 standards documents discussed earlier. To improve the accuracy of the MVs for the input MBs from the MPEG-4 decoder 602, their accuracy need to be increased from half-pixel to quarter-pixel. Unfortunately, this refinement is computationally demanding. In order to decrease the computational complexity, MVs are refined by the embodiments of the invention only when needed. By doing so, it can significantly reduce computation complexity, contrary to the method discussed in the paper by Liang et al. described earlier, where all the MVs are refined to a quarter-pixel accuracy.

The embodiment of the invention exploits the residual information once again, in order to determine whether or not a MV for an input MB requires refinement. Indeed, we have already mentioned that the residual information can be used as an efficiency measure of ME. For each candidate transcoding mode, the residual energy for the input MB, E, or for the kth 8×8 block within its constituent partitions, $E_k$, are tested. If the residual energy is below a threshold, the MV is kept as is, otherwise it is refined from a half-pixel to a quarter-pixel accuracy. The fast refinement algorithm used in the Intel MPEG-4 encoder part of the "Intel® Integrated Performance Primitives 5.3—Code Samples", available from http://software.intel.com/en-us/intel-ipp/, is used. According to that method, 5 half-pixel positions $p_i$ are evaluated instead of 8 quarter-pixel positions to find the best position. The method used for MV refinement used for increasing accuracy of the MV is described in FIG. 8 where $b_i$ is the sum of absolute differences (SAD) of the position pixel $p_i$.

Figure 8A:
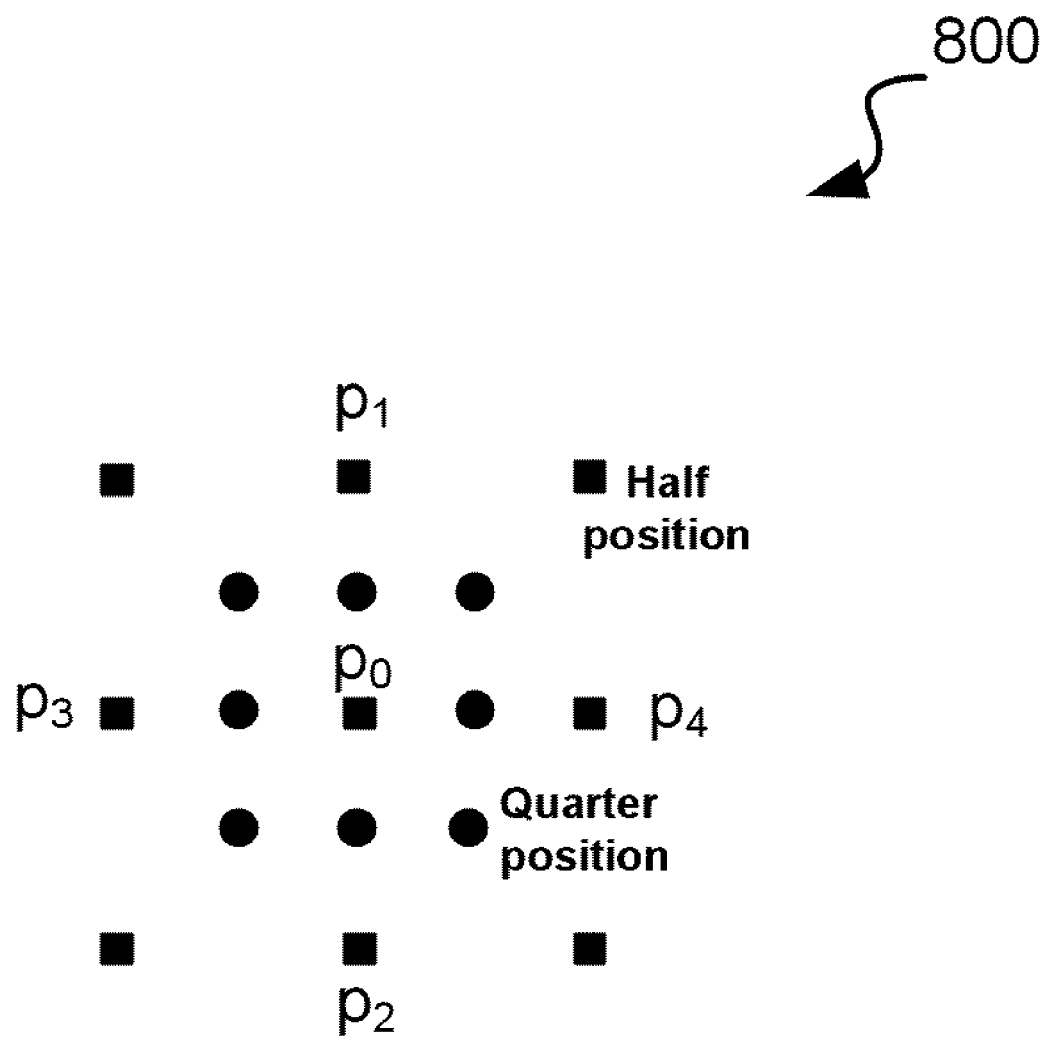
FIG. 8(a) illustrates accuracy enhancement for motion vectors.

Diagram 800 presented in FIG. 8(a) explains the half to quarter position refinement process (i.e. the process of refining a motion vector with half pixel accuracy to a motion vector with quarter pixel accuracy). The squares represent the half pixel positions and the circles the quarter pixel positions around position p0. p0 corresponds to the half position motion vector which is to be refined. Let (x,y) be the coordinates of motion vector corresponding to p0. The goal is to refine this motion vector to a quarter position around p0 to obtain a refined motion vector corresponding to a position p0' having coordinates (x,y)+(j,i)/4 with i and j in the range of +/−1. This quarter position (j,i) is found according the method described in the flowchart displayed in FIG. 8(b) and in the flowchart displayed in FIG. 8(c). Please note that b0, b1, b2, b3 and b4 are respectively the sum of absolute differences (SAD) for the following positions: p0, p1 (above half position to p0), p2 (bottom half position to p0), p3 (left half position to p0) and p4 (right half position to p0).

Figure 8B:
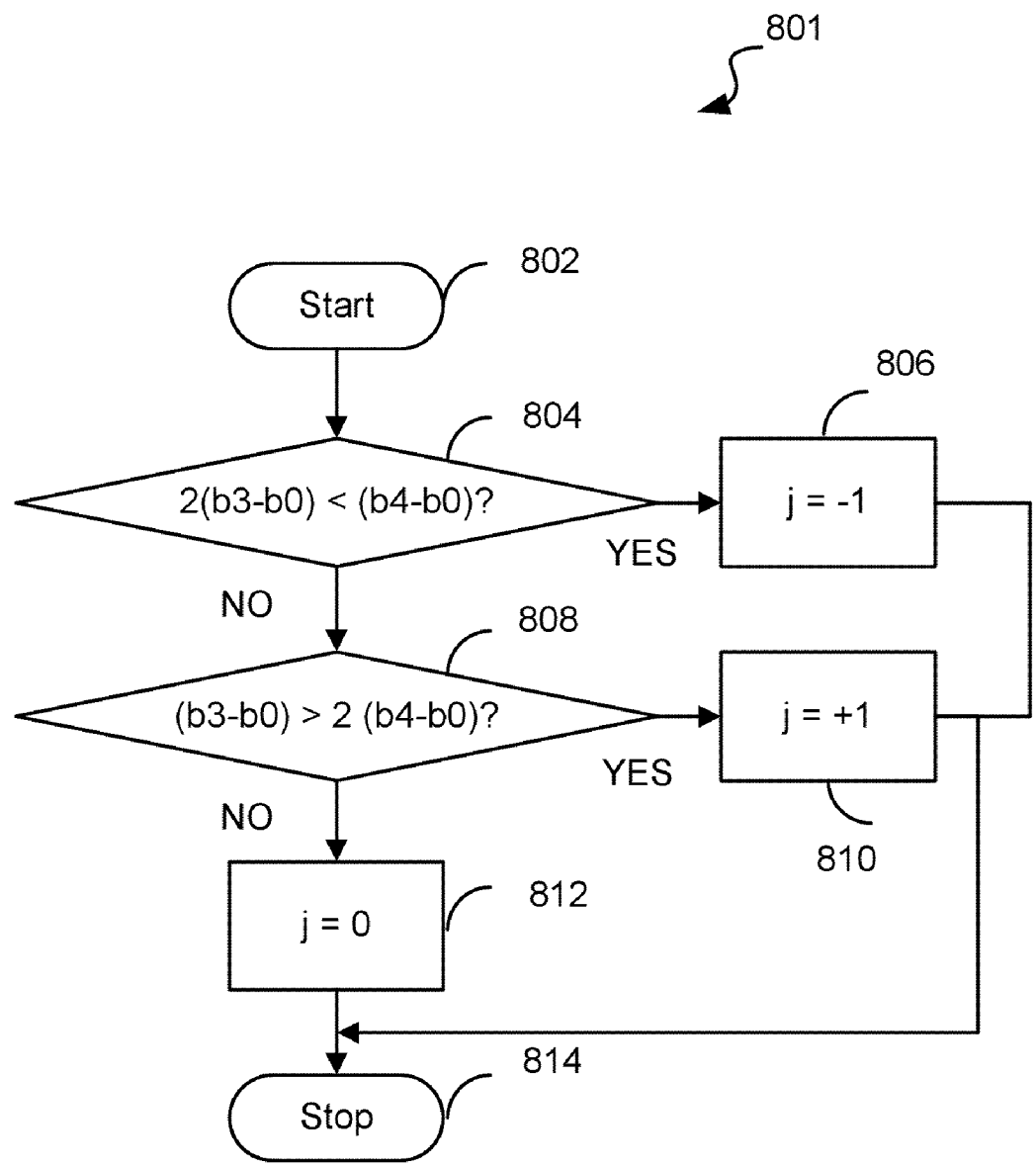
FIG. 8(b) shows a flowchart for determining the j value for the quarter position.

The determination of the value of j is explained with the help of the flowchart 801 presented in FIG. 8(b). Upon start (box 802), the procedure 801 checks whether or not 2(b3-b0) is less than b4-b0 (box 804). If this is the case, the procedure 801 exits 'YES' from box 804, sets the value of j to −1 (box 806) and exits (box 814). Otherwise, the procedure 801 exits 'NO' from box 804 checks whether or not (b3-b0) is greater than 2(b4-b0) (box 808). If so, the procedure exits 'YES' from box 808, sets the value of j to +1 (box 810) and exits (box 814). Otherwise, the procedure 801 exits 'NO' from box 808, sets the value of j to 0 (box 812) and exits (box 814).

Figure 8C:
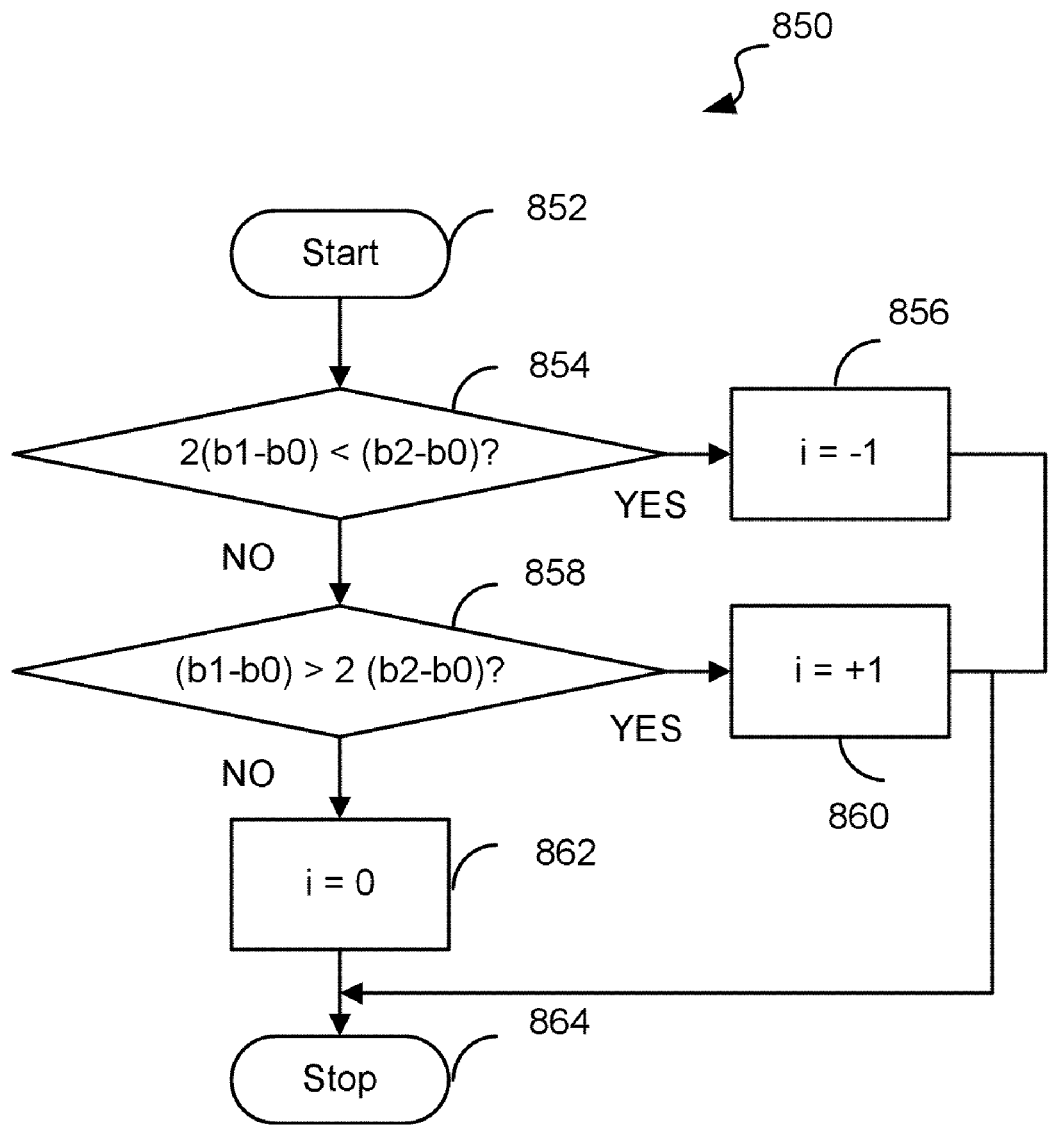
FIG. 8(c) shows a flowchart for determining the i value for the quarter position.

The determination of the value of i is explained with the help of the flowchart 850 presented in FIG. 8(c). Upon start (box 852), the procedure 850 compares whether or not 2(b1-b0) is less than b2-b0 (box 854). If this is the case, the procedure 850 exits 'YES' from box 854, sets the value of i to −1 (box 856) and exits (box 864). Otherwise, the procedure 850 exits 'NO' from box 854 checks whether or not (b1-b0) is greater than 2(b2-b0) (box 858). If so, the procedure exits 'YES' from box 858, sets the value of i to +1 (box 860) and exits (box 864). Otherwise, the procedure 850 exits 'NO' from box 858, sets the value of i to 0 (box 862) and exits (box 864).

Figure 9:
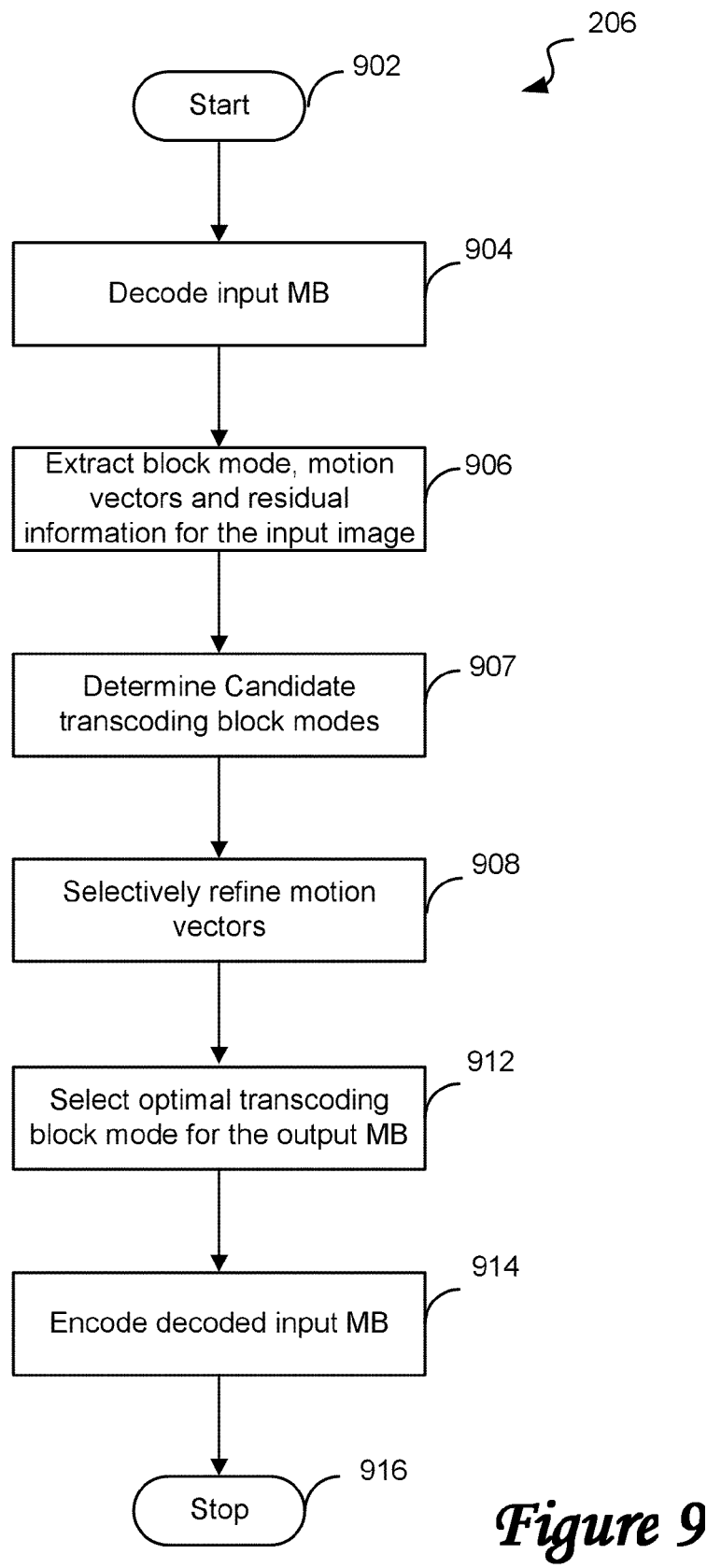
FIG. 9 shows a flowchart illustrating the step "Transcode sequence of input images into sequence of output images (box 206) in more detail.

The method for performing online transcoding captured in box 206 of FIG. 2 is explained with the help of flowchart 206 displayed in FIG. 9. Each input image in the sequence of input images encoded in the first format is transcoded into an output image encoded in the second format. As mentioned earlier, each input image in turn comprises input macroblocks whereas the corresponding output image comprises output macroblocks. Each input macroblock is transcoded by the procedure 206 into a corresponding output macroblock. The steps of the method that performs this transcoding is explained with the help of procedure 206 displayed in FIG. 9. Upon start (box 902), the procedure 206 decodes the input macroblock (box 904) producing a decoded input macroblock and extracts the encoding block mode, motion vectors and residual information for this input MB (box 906). Candidate transcoding block modes that are to be considered are then determined (box 907). In the preferred embodiment this information is obtained from the block mode conversion table (generated in the step represented by box 202 of the flowchart 200 presented in FIG. 2) by reading the second tuple 454 corresponding to the first tuple 452 and the third tuple 456 the contents of which match the encoding block mode and class of the input MB respectively. The motion vectors for this input macroblock are then selectively refined (box 908). Based on the results of the motion vector refining the optimal transcoding block mode that optimizes a characteristic of the output image is selected (box 912). The optimal transcoding block mode has an associated optimal motion vector. Please note that there is a tradeoff between image quality and image size and the optimal transcoding block mode optimizes image quality against image size. The decoded input macroblock is then encoded in the second format by using the optimal transcoding block mode selected in box 912 (box 914) and the associated motion vector. After completing the encoding operation, the procedure 206 exits (box 916).

Figure 12:
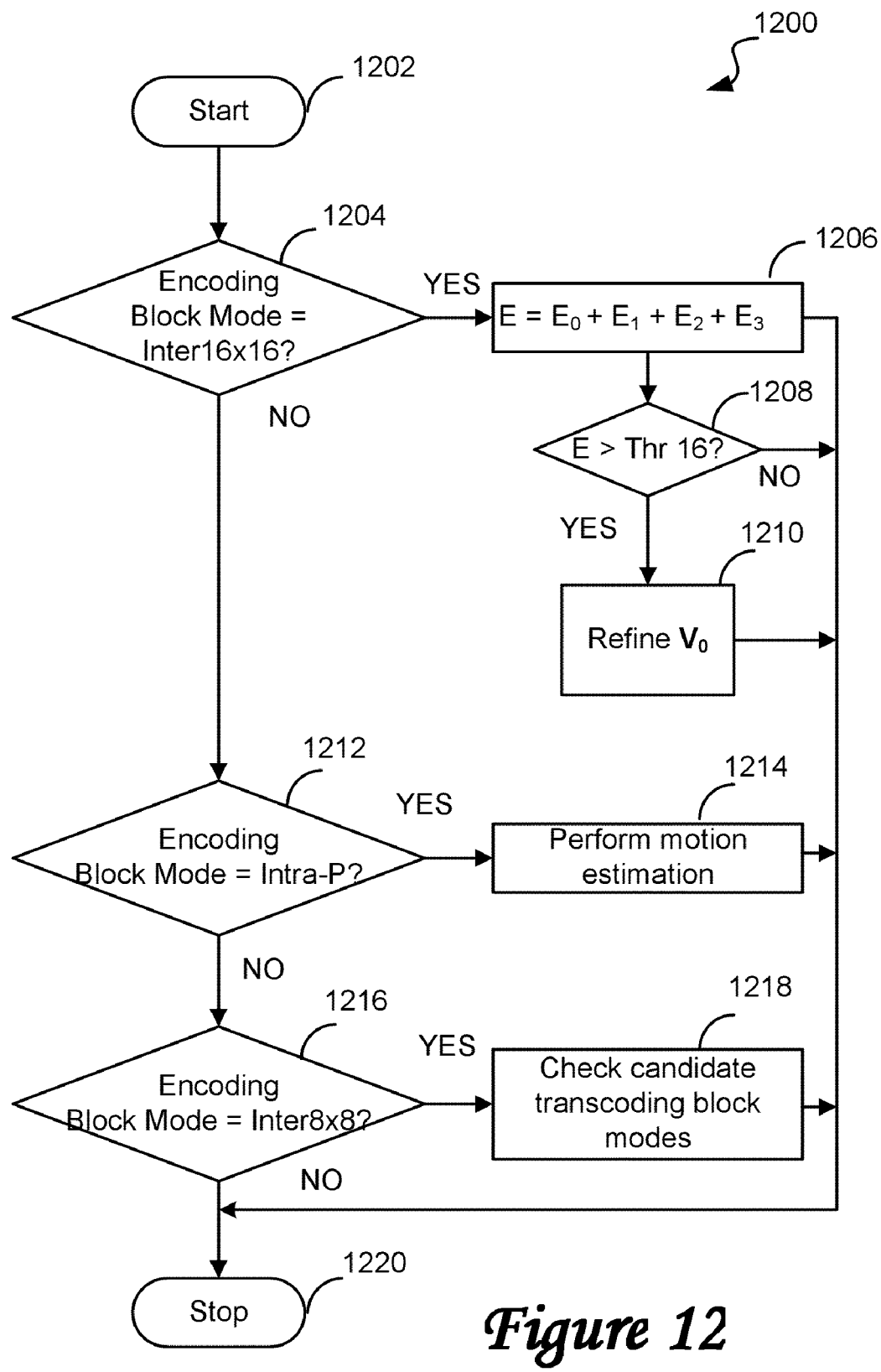
FIG. 12 presents a flowchart illustrating the step "Selectively refine motion vectors" (box 908) in more detail.

The step "Selectively refine motion vectors" (box 908) of procedure 206 displayed in FIG. 9 is explained further with the help of flowchart 1200 displayed in FIG. 12. Before explaining the flowchart 1200, a high level discussion of the selective refinement technique is presented.

For the decision as to whether or not to refine a MV for the input MB, two categories for the input MB, a first category and a second category are used. As mentioned earlier, the first and the second categories respectively correspond to the extracted encoding block mode for the input MB belonging to a predetermined first set and second set of encoding block modes for the input MB. In the preferred embodiment of the invention, the first category includes inter8×8 encoding block mode for MPEG-4 whereas the second category includes Inter16×16 encoding block mode for MPEG-4. Two thresholds, a first energy threshold and a second energy threshold are used in making the decision of whether or not to refine a MV. In the preferred embodiment the first energy threshold and the second energy threshold are referred to as Thr8 and Thr16 respectively as they are used with decoded input MBs that were originally encoded in Inter8×8 and Inter16×16 MPEG-4 block modes. Through analysis and experimentation, it was concluded that these thresholds have to be bitrate-dependent in order to maintain a certain level of image quality. Indeed, as the bitrate is reduced, the H.264 encoder's RDO tends to map more MBs to the SKIP mode, which has the effect of decreasing quality. As a matter of fact, the smaller the bitrate, the smaller the SAD of an Inter block has to be in order to be assigned to Inter block mode (the overhead cost associated with transmission of MVs becoming increasingly important). As a consequence, as the output bitrate becomes smaller, we have to reduce the thresholds to increase the number of MVs that will be refined, leading to smaller SAD values, and consequently increasing quality. The determination of optimal thresholds as a function of the output bitrate in accordance with the RDO process is a topic for future research. Nevertheless, good results were obtained by using the same methodology as before, showing the benefits of the method of the embodiments of the invention, by setting {Thr8=62,5,Thr16=500} for small target bitrates (64 kbits and below for QCIF sequences, 256 kbit/s and below for CIF sequences for example) and {Thr8=250, Thr16=2000} for higher target bitrates. It is worth noting that the threshold values have a direct impact on the tradeoffs the system makes between computation complexity and video quality. Small thresholds increase quality, but also computational complexity, and the thresholds can be adjusted to meet the specific transcoding system's requirements.

Figure 10:
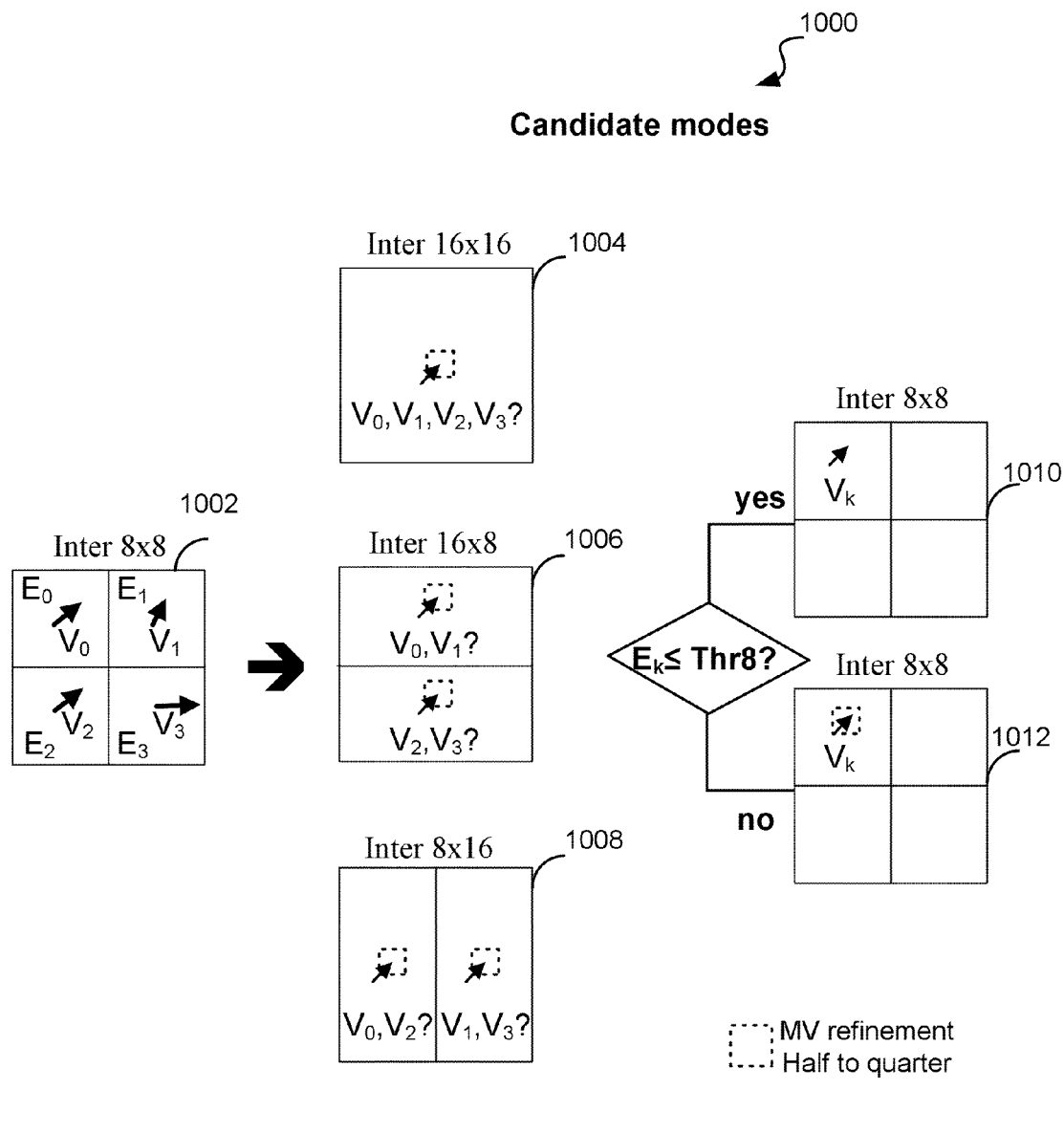
FIG. 10 shows a procedure for selectively refining MVs for an Inter8×8 encoding bock mode.
Figure 11:
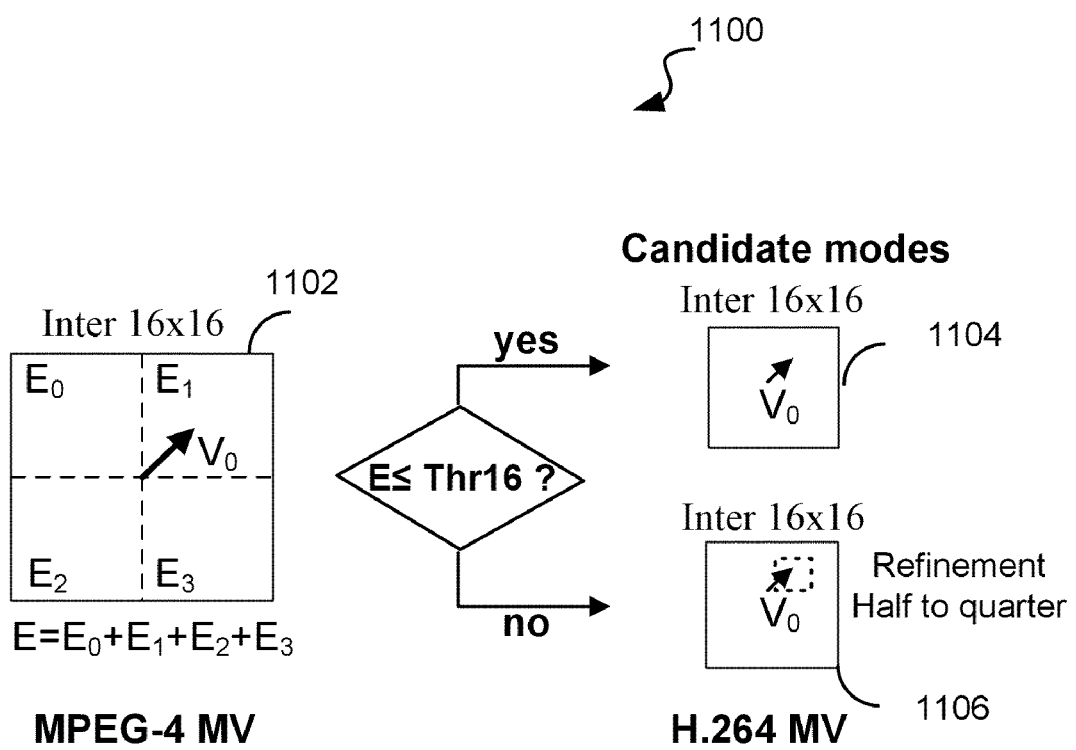
FIG. 11 shows a procedure for selectively refining MVs for an Inter16×16 encoding bock mode.

The process for handling the various encoding block modes extracted while decoding an input MB encoded in the MPEG-4 is summarized. FIG. 10 and FIG. 11 illustrate the MV determination and refinement process for two encoding block modes for MPEG-4: Inter8×8 and Inter 16×16 respectively.

Intra-P: The Inter16×16 MV is found by performing ME (using the EPZS algorithm in the simulations reported in this document), since there is no initial MV. But, because there are so few of these types of MB, they have no noticeable impact on speed. The EZPS algorithm is described in the paper by A. M. Tourapis, "Enhanced predictive zonal search for single and multiple frame motion estimation," in Visual Communications and Image Processing, January 2002, pp. 1069-1079.

Inter8×8 with decoded MPEG-4 MVs $V_k$, $0 \leq k \leq 3$: This corresponds to the first category of input MBs. Diagram 1000 presented in FIG. 10 shows the MPEG-4 MV 1002 for an Inter8×8 encoding block mode. Since a partition with a size of 8×8 is used, four motion vectors $V_0$-$V_3$ each corresponding to a specific partition are extracted from the input MB. Two predetermined lists: a first list and a second list of candidate transcoding block modes are used. When the candidate transcoding block mode belongs to the first list of candidate transcoding block modes, the accuracy of the motion vectors associated with partitions whose residual energy is above the first energy threshold Thr8 are increased. In the preferred embodiment, the first list includes an Inter8×8 candidate transcoding block mode. Thus a given $V_k$ is refined to quarter-pixel accuracy when the residual energy $E_k$>Thr8 (see 1012 in diagram in FIG. 10); otherwise the $V_k$ extracted from the input MB is re-used (see 1010 in FIG. 10). For transcoding block modes belonging to the second list of transcoding block modes, accuracy of the motion vectors for the input MB are increased. In the preferred embodiment the second list of candidate transcoding block modes include Inter16×16, Inter16×8 and Inter8×16. For these candidate transcoding block modes the selected MVs are always refined. Alternatively, to reduce the computational overhead only the MV with the smallest SAD is refined. Although the second alternative improves transcoding speed, it may be give rise to a reduction in image quality in comparison to the first alternative. The processing of the three different candidate block modes are shown in 1004, 1006 and 1008 (see FIG. 10). In an alternative embodiment, the residual energy-based method, used for partitions with a size of 8×8, is extended to these candidate transcoding block modes as well. For the case of the Inter16×16 candidate transcoding block mode, the SAD is computed at half-pixel accuracy, with the four MV candidates $V_k$ and the one with smallest SAD is selected. The selected MV is then refined to a quarter-pixel accuracy. A similar process is performed for Inter16×8 and Inter8×16 candidate transcoding block modes.

Inter16×16 with decoded MPEG-4 MV $V_0$: Diagram 1100 presented in FIG. 11 shows the MPEG-4 MV 1102 for an Inter16×16 encoding block mode. $V_0$ is refined to quarter-pixel accuracy when the residual energy for the input MB E>Thr16 (see 1106 in FIG. 11); otherwise, $V_0$ is re-used (see 1104 in FIG. 11).

Once the MVs and corresponding SADs have been determined for all candidate transcoding block modes, the optimal transcoding block mode is selected using H.264 RDO.

Please note that the selective refinement technique captured in the procedure 1200 of FIG. 12 is applied for each candidate transcoding block mode determined in the step represented by box 907. Upon start (box 1202), the procedure 1200 checks whether or not the encoding block mode for the input MB is inter16×16 (box 1204). If so, the procedure exits 'YES' from box 1204 and computes E as the sum of $E_1$, $E_2$, $E_3$ and $E_4$ (step 1206) where $E_i$ (i=1 . . . 4) is the residual energy for the 8×8 block i. Otherwise, the procedure exits 'NO' from box 1204 and checks whether or not the encoding block mode for the input MB is intra-P (box 1212). If so, the procedure 1200 exist 'YES' from box 1212, performs motion estimation (box 1214) and exits (box 1220). Otherwise, the procedure 1200 exits 'NO' from box 1212, and checks whether or not the encoding block mode for the input MB is Inter8×8 (box 1216). If so, the procedure 1200 exits 'YES' from box 1216, checks the candidate transcoding block modes (box 1218) and exits (box 1220). After completing the operations in box 1206, the procedure 1200 checks whether E exceeds a second energy threshold Thr16 (box 1208). If so, the procedure 1200 exits 'YES' from box 1208 and refines the motion vector $V_0$ that corresponds to partition 0 (box 1210), and exits (box 1220). Otherwise, the procedure 1200 skips the operation performed in box 1210 and exits (box 1220).

Figure 13A:
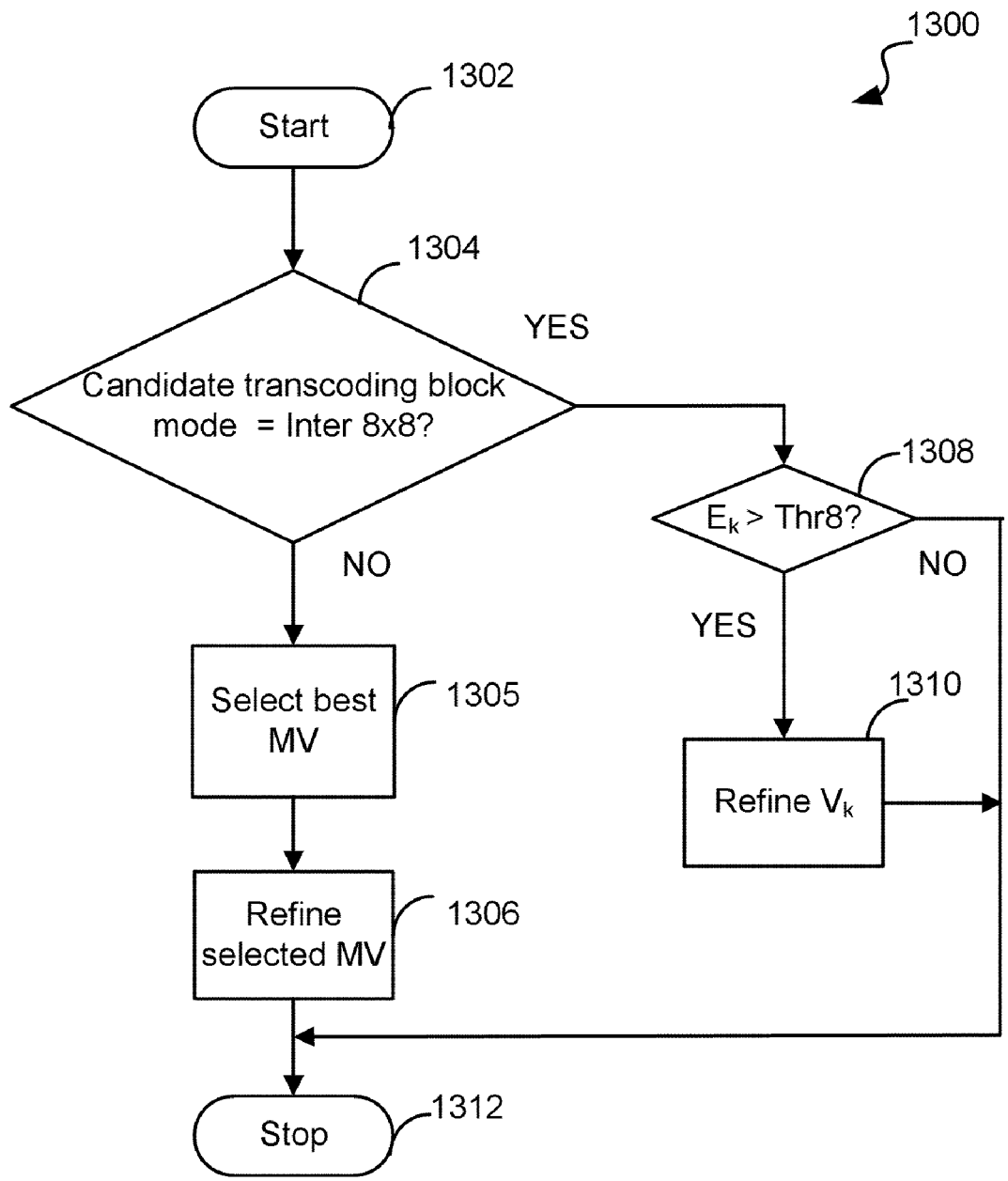
FIG. 13(a) presents a flowchart illustrating the step "check candidate transcoding block modes" (box 1218) in more detail.

The step "check candidate transcoding block modes" (box 1218) in FIG. 12 is explained further with the help of flowchart 1300 presented in FIG. 13(a). Upon start (box 1302), the procedure 1300 checks whether the candidate transcoding block mode is Inter8×8 (box 1304). If so, the procedure exits 'YES' from box 1304 and checks if $E_k$ is greater than Thr8. Please note that this operation is performed for each partition k ($0 \leq k \leq 3$). If $E_k$>Thr8, the procedure exits 'YES' from box 1308 and refines the MV $V_k$ associated with the partition k within the input MB. Refinement of a MV increases the accuracy of the motion vector from a half pixel to a quarter pixel. Otherwise the refinement operation performed in box 1310 is skipped. After all the partitions are handled, the procedure exits (box 1312). If the candidate transcoding block mode is not Inter8×8 (i.e. for an Inter 16×16 or Inter 16×8 or Inter 8×16 candidate transcoding block mode), the procedure 1300 exits 'NO' from box 1304, selects the best motion vector among the candidate motion vectors for each partition in the input MB (box 1305), refines the selected motion vector for each partition (box 1306) and exits (box 1312). Please note that the best motion vector is the motion vector that produces the lowest SAD.

Figure 13B:
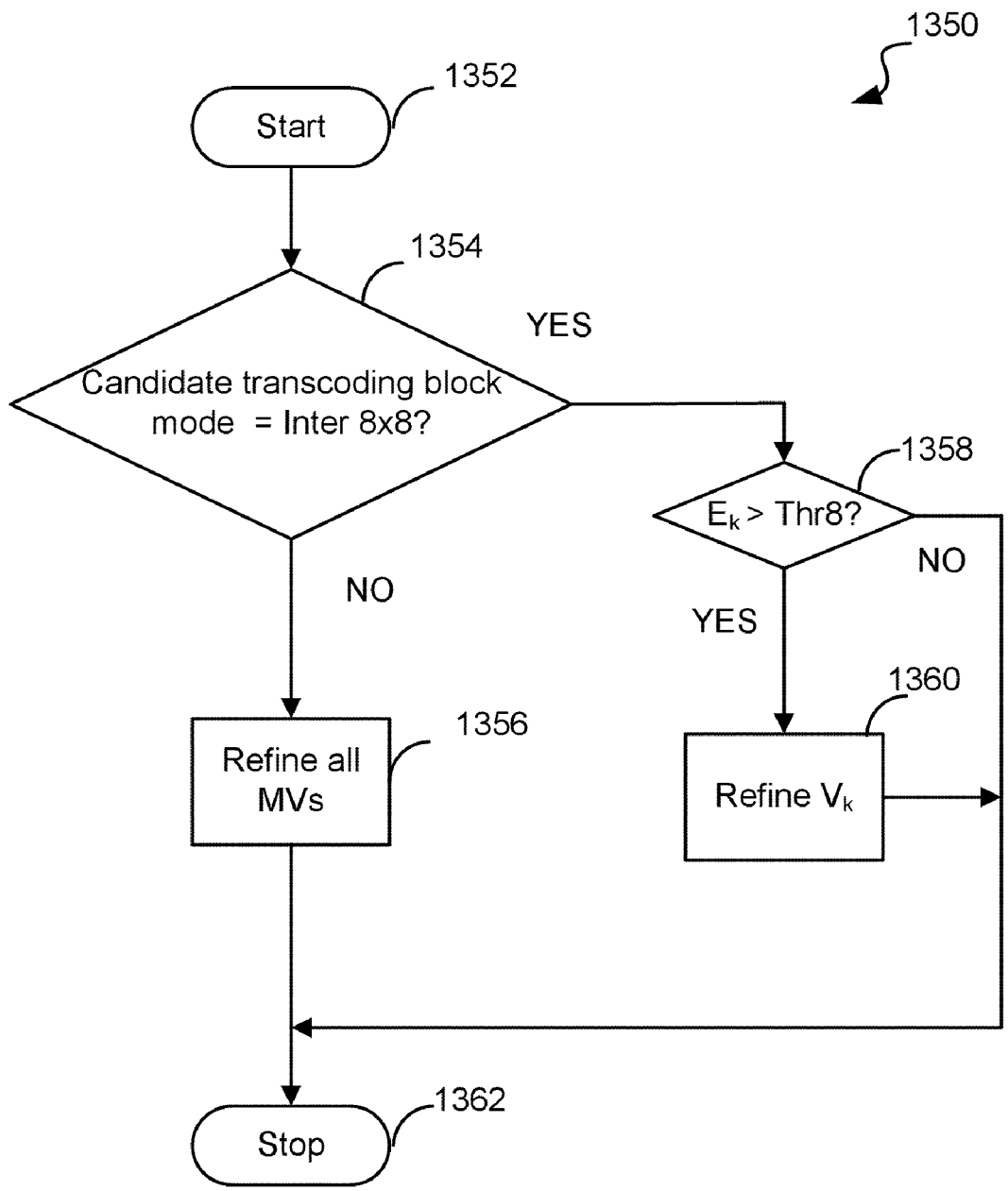
FIG. 13(b) presents a flowchart illustrating an alternative method for performing the step "check candidate transcoding block modes" (box 1218)

An alternative method for performing the step 1218 of FIG. 12 is explained with the help of flowchart 1350 shown in FIG. 13(b). Upon start (box 1352), the procedure 1350 checks whether the candidate transcoding block mode is Inter8×8 (box 1354). If so, the procedure exits 'YES' from box 1354 and checks if $E_k$ is greater than Thr8. Please note that this operation is performed for each partition k ($0 \leq k \leq 3$). If $E_k$>Thr8, the procedure exits 'YES' from box 1358 and refines the MV $V_k$ associated with the partition k within the input MB. Refinement of a MV increases the accuracy of the motion vector from a half pixel to a quarter pixel. Otherwise the refinement operation performed in box 1360 is skipped. After all the partitions are handled, the procedure exits (box 1362). If the candidate transcoding block mode is not Inter8×8 (i.e. for an Inter 16×16 or Inter 16×8 or Inter 8×16 candidate transcoding block mode), the procedure 1350 exits 'NO' from box 1354, refines all the motion vectors in the input MB (box 1356) and exits (box 1362). The second alternative gives rise to a higher computational overhead in comparison to the first alternative but leads to a potential improvement in image quality.

Figure 14:
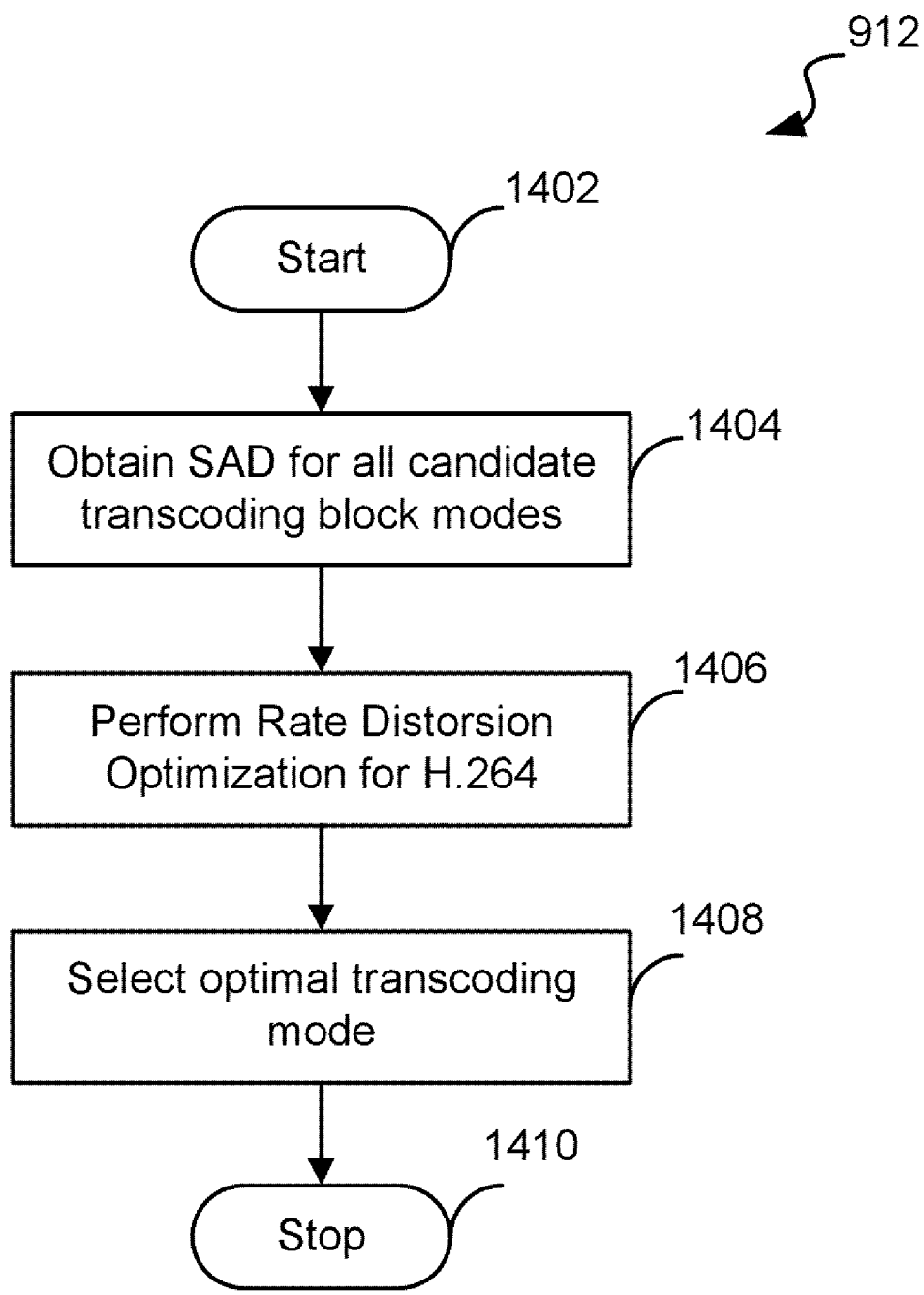
FIG. 14 shows a flowchart illustrating the step "Select optimal transcoding block mode for the output image" (box 912) in more detail.

The step "Select optimal transcoding block mode for the output image" (box 912) of procedure 206 displayed in FIG. 9) is explained further with the help of flowchart 1400 displayed in FIG. 14. Upon start (box 1402), the procedure 1400 obtains the sum of absolute difference (SAD) for all candidate transcoding block modes determined in box 907 in flowchart 206 of FIG. 9 (box 1404). A conventional Rate Distortion Optimization (RDO) for H.264 is then performed (box 1406) and the optimal transcoding block mode is selected (box 1408). After selecting the optimal transcoding block mode the procedure 1400 exits (box 1410). Please note that measures other than the SAD can also be used in box 1404.

Experimental Analysis

The proposed method of the embodiments of the invention, along with other state-of-the-art methods, were implemented in the Intel IPP (Intel Integrated Performance Primitives) code samples, version 5.3 cited above. These video codecs are highly optimized compared to the MPEG-4 and H.264 reference codecs (MoMuSys (described in ISO/IEC 14496-5: 2001, "Information technology—Coding of audio-visual objects—Part 5: Reference Software", second edition, February 2005) and Joint Model (JM) described in H.264/AVC reference software JM 15.1. available from http://iphome.h-hi.de/suehring/tml/.). Although the H.264 JM is an excellent reference to validate rate distortion performance, it is not optimized for speed of transcoding and therefore cannot be used as a reliable reference to measure improvements in speed. The results on Intel's codecs are much more representative of the gains obtainable on a real transcoding product, although it may use less exhaustive algorithms. Intel's codecs speed up the encoding process by skipping certain steps of the process when a set of given conditions are met. The video sequences were initially encoded with high quality using MPEG-4 VSP at 30 fps with one Intra frame every 100 Inter frames (i.e. every 3.3 s) at 200 kbit/s and 720 kbit/s for QCIF and CIF respectively (other initial rates were tested with small differences in final performance). No B frames were used. The H.264 encoding options were: RDO, maximum quality, one reference frame, and sum of absolute transform difference (SADT) instead of SAD.

Quality was assessed by measuring peak signal-to-noise ratio (PSNR) and the computation times of the following methods: cascaded transcoding, MV refinement with mode selection (MS) discussed in the paper by Liang et al. described earlier, the statistical method with and without refinement discussed in the paper by Lee et al. described earlier, and the method of the embodiments of the invention. The performance of each method was compared with the cascade method. The results for various video sequences are presented in FIG. 15 (a),—FIG. 15(d) and FIG. 16. The results are quite impressive, namely the method of the embodiments of the present invention is, on an average, 2 to 3 times faster than the cascade method with only ~0.5 dB loss in quality. We observe that, as the bitrate increases, the difference in quality decreases with respect to the cascade method and the gains in speed increase. Only the statistical approach without refinement is faster than the method of the embodiments of the invention. However, its PSNR is significantly lower (2.0 dB less, on average, for QCIF and 2.5 dB for CIF) than that achieved with the method of the embodiments of the invention. Such a loss in quality is often unacceptable in many applications. Moreover, one could possibly obtain similar gains in speed by changing the threshold values Thr8 and Thr16 used in the invention. Compared to the MV refinement in the MS algorithm, the method of the embodiments of the invention is 30% faster, on average, and provides better quality (1 dB better, on average, for QCIF and 1.5 dB for CIF). The differences in quality between the proposed method and state-of-the-art methods are particularly noticeable at low bitrates.

The results presented in the papers by Lee et al. and Liang et al., were obtained with the reference codecs MoMuSys (Mobile Multimedia Systems) and JM. With a more optimized codec, such as that of Intel, their speed-ups are much less impressive. For instance, Liang et al. (MV refinement and MS) obtained an average speed-up of 10.36, while this invention obtained an average of 2 using Intel codecs.

FIG. 15(a) and FIG. 15(b) illustrate peak signal-to-noise ratio and speed-up results for various QCIF videos and bitrates. Table 1500 shown in FIG. 15(a) presents the results for bitrates of 32 Kbits/s and 64 Kbit/s whereas Table 1525 shown in FIG. 15(b) presents the results for bitrates of 96 Kbits/s and 128 Kbits/s. FIG. 15(c) and FIG. 15(d) illustrate peak signal-to-noise ratio and speed-up results for various CIF videos and bitrates. Table 1550 shown in FIG. 15(c) presents the results for bitrates of 128 Kbits/s and 256 Kbit/s whereas Table 1575 shown in FIG. 15(d) presents the results for bitrates of 384 Kbits/s and 512 Kbits/s. Numerous methods are compared against the cascade method: MV+MS discussed in the paper by Liang et al., statistics with and without refinement discussed in the paper by Lee et al., and the method of the embodiments of the invention. The PSNR rows show differences from the PSNR values of the cascade method. The speed-up rows are defined as $T_{cascade}/T_{method}$, with T representing the transcoding time.

Figure 16A:
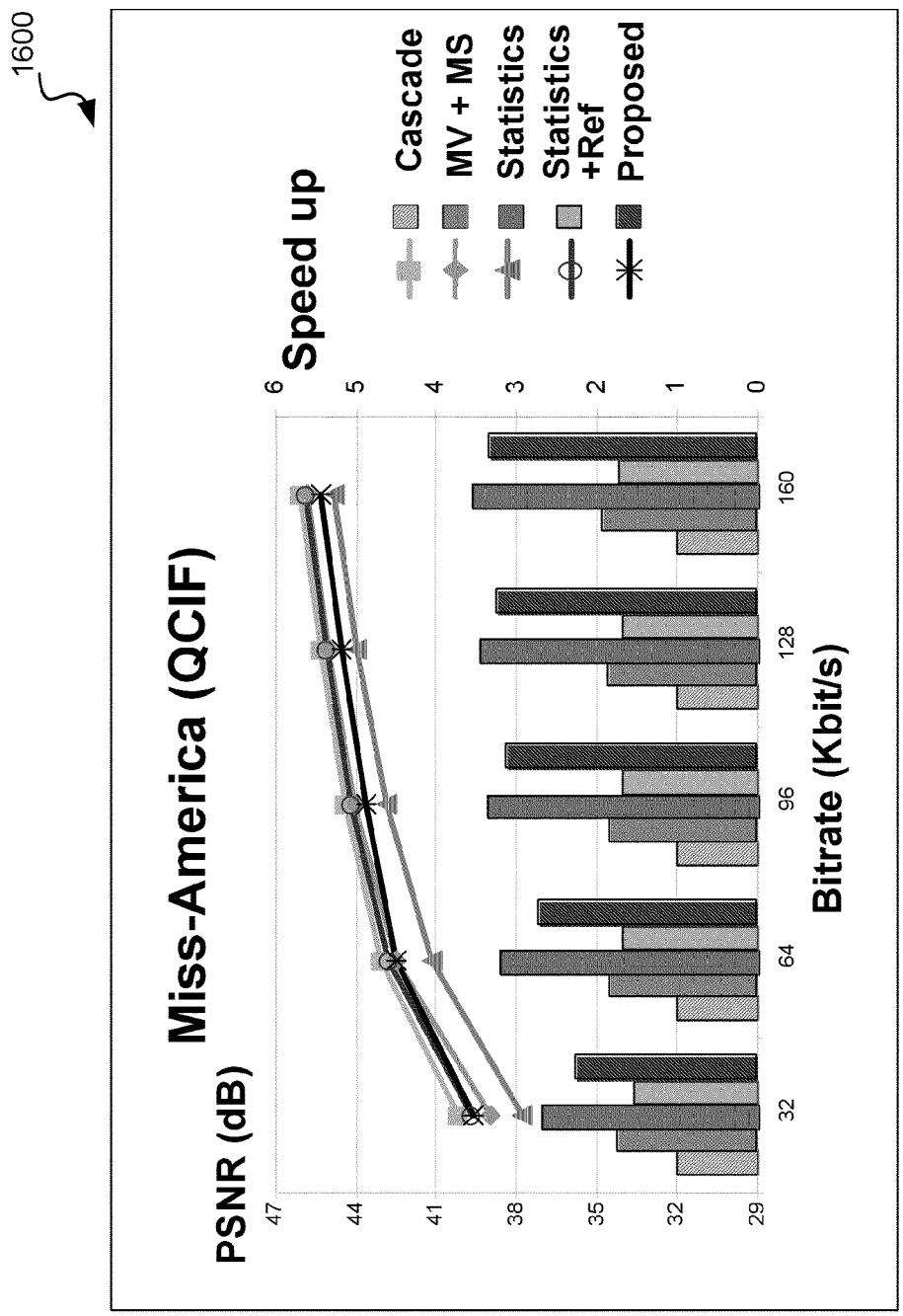
FIG. 16(a) illustrates PSNR and speed-up results for the Miss America (QCIF) video at different bitrates.
Figure 16B:
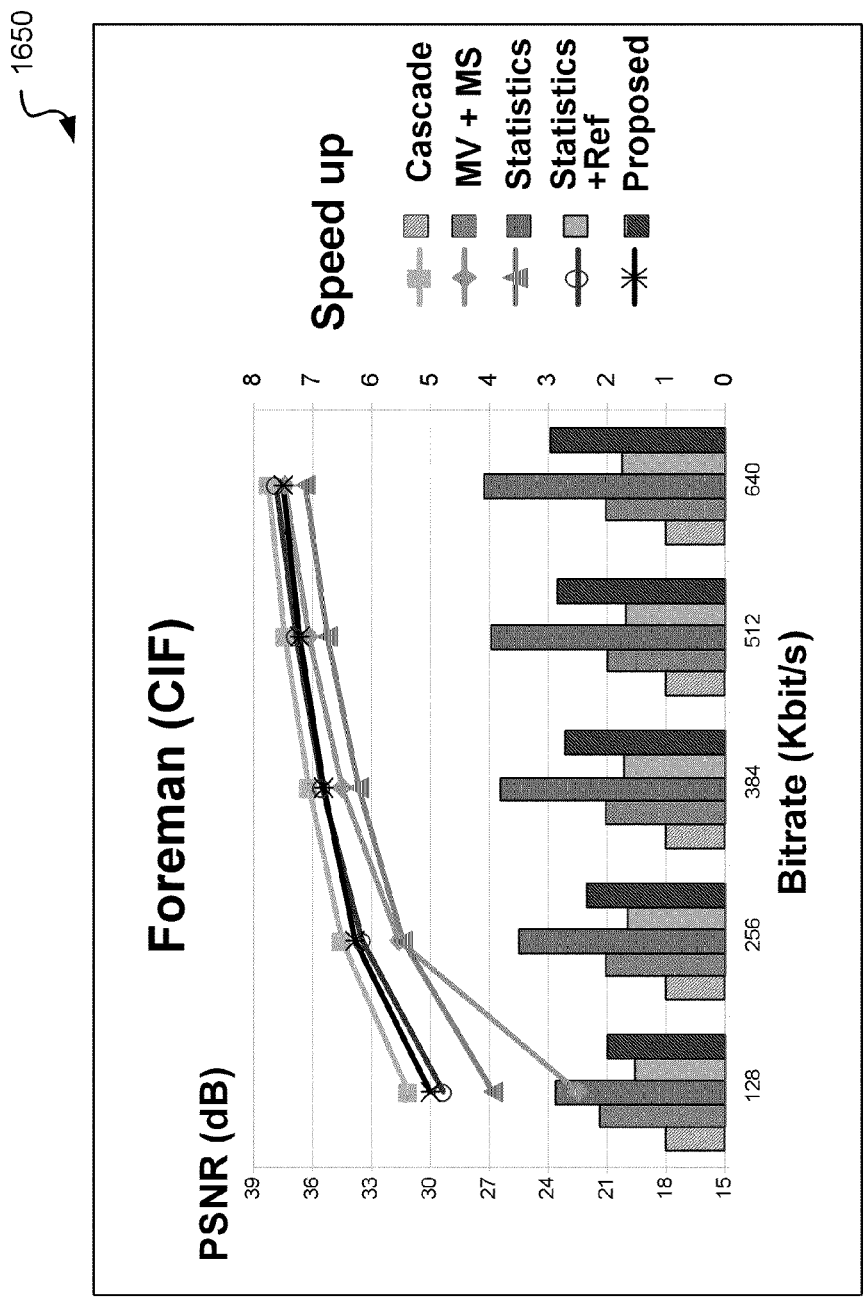
FIG. 16(b) illustrates PSNR and speed-up results for Foreman (CIF) video at different bitrates.

FIG. 16(a) illustrates PSNR and speed-up graphs 1600 for the Miss America (QCIF) and whereas FIG. 16(b) illustrates PSNR and speed-up graphs 1650 for Foreman (CIF) videos at different bitrates. Speed-ups defined as $T_{cascade}/T_{method}$, with T representing the transcoding time. The methods demonstrate the following order for speed-up results: cascade, MV+MS discussed in the paper by Liang et al., statistics with and without refinement discussed in the paper by Lee et al., and the method of the embodiments of the invention.

In this patent application, we have disclosed an efficient method and system for transcoding a sequence of input images comprising input MBs encoded in the first format that includes MPEG-4 to a sequence of output images comprising output MBs encoded in the second format that includes H.264. By exploiting the residual information gathered in the MPEG-4 decoder in addition to the MVs and block modes, the methods of the embodiments of the invention significantly improve the speed of transcoding (by a factor of 2 to 3) while maintaining good quality compared to the cascade method. The methods of the embodiments of the invention also provide superior results compared to state-of-the-art methods. The impressive speed-ups make the methods of the embodiments of the invention very suitable for real-time applications. The approach described in the present application is also applicable to other transcoding use cases as well, such as from H.263 to H.264.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect. Although in the methods and system described above, the sizes of partitions within a MB are the same, it is understood that in other implementations of the methods and system of the embodiments of the invention, partitions of different sizes can be also accommodated within a MB.

The set of candidate transcoding block modes may be fine tuned dynamically by monitoring the performance of the online transcoding. Videos may be classified into various types and a specific set of thresholds that correspond to the current video being transcoded may be read from a table at the beginning of the online transcoding. Various threshold values can be preselected in such a way that MVs are always refined. Also, motion vector refinements may be performed on candidate motion vectors rather than after the best one is selected. Actually, motion refinement may occur in various steps of the process. The techniques presented in this document for inter MB may also be applied to intra MB. For instance, intra MBs may be classified based on their residual information or if they came from an intra or inter frame. Different candidate modes could be considered for the various classes.

Although the embodiments of the invention have been described in detail, it will be apparent to one skilled in the art that variations and modifications to the embodiment may be made within the scope of the following claims.

What is claimed is:

1. A computerized method for generating a block mode conversion table for selecting transcoding block modes required for transcoding a sequence of input images, each input image comprising one or more input macroblocks of pixels encoded in a first format into a sequence of output images, each output image comprising one or more output macroblocks of pixels encoded in a second format, the method comprising:
   (a1) providing training images, each training image comprising one or more training macroblocks of pixels encoded in the first format;
   (b1) transcoding each training macroblock (MB) into a transcoded training MB encoded in the second format by using a codec device; and
   (c1) generating the block mode conversion table containing multi-tuples, each multi-tuple having a first tuple, a second tuple, and a third tuple, each said first tuple including a first training block mode for a sub-set of the training MBs encoded using the first training block mode, each said second tuple including a class identifier for the training MBs, identifying those MBs in the sub-set, whose residual information satisfies a predetermined set of constraints, and each said third tuple including a list of second training block modes used by the codec device in transcoding those training macroblocks in the sub-set that have the class identifier indicated in the corresponding said second tuple.

2. The method of claim 1, wherein the input MBs, output MBs, training MBs, and the transcoded training MBs have one or more partitions and the transcoding block mode, the first training block mode and the second training block mode indicate size of partitions within the output MB, the training MB and the transcoded training MB respectively.

3. The method of claim 2, further comprising the step of computing a residual energy for the training MB, the step being performed after the step (b1) and before the step (c1).

4. The method of claim 3, wherein the pre-determined set of constraints further comprises a constraint on the residual energy for the training MB.

5. The method of claim 4, wherein the step (b1) further comprises extracting a motion vector (MV) for the training MB and generating a motion vector for the transcoded training MB.

6. The method of claim 5, wherein the pre-determined set of constraints further comprises constraints on a difference between the MV for the training MB and a predicted MV for the transcoded training MB.

7. The method of claim 2, wherein the list in the step (c1) includes those second training block modes whose frequency of usage is above a predetermined usage threshold.

8. The method of claim 2, wherein the step (c1) comprises:
   (a8) for each training MB, generating a record including the first training block mode, the second training block mode and the class identifier; and
   (b8) processing records for the training MBs for generating the block mode conversion table.

9. The method of claim 8, wherein the step (b8) comprises:
   (a9) arranging the records into groups each group characterized by a unique combination of the first training block mode and the class identifier;
   (b9) for each group, recording a set of the second training block modes used by the codec device for transcoding the training MBs in the group;
   (c9) processing the groups to generate the multi-tuples in the block mode conversion table; and
   (d9) storing the block mode conversion table.

10. The method of claim 9, wherein the step (c9) comprises:
   (a10) for each group creating a multi-tuple in the block mode conversion table;
   (b10) storing the first training block mode in said first tuple, and the class identifier characterizing said each group in said second tuple; and
   (c10) storing the set of the second training block modes for the group in said third tuple.

11. The method of claim 10, wherein the set of the second training block modes includes those second training block modes whose frequency of usage is above a predetermined usage threshold.

12. The method of claim 1, wherein the first format is one of H.263, H.264, MPEG-2 and MPEG-4, and the second format is one of H.263, H.264, MPEG-2 and MPEG-4.

13. The method of claim 1, wherein the sequence of input images is an input video and the sequence of output images is an output video.

14. A system for generating a block mode conversion table for selecting transcoding block modes for transcoding a sequence of input images, each input image comprising one or more input macroblocks of pixels encoded in a first format into a sequence of output images, each output image comprising one or more output macroblocks of pixels encoded in a second format, the system comprising:
   a processor, and a non-transitory computer readable storage medium having computer readable instructions stored thereon, for execution by the processor, forming:
   (a14) a training image repository providing training images, each training image comprising one or more training macroblocks of pixels encoded in the first format;
   (b14) a codec device transcoding each training macroblock (MB) into a transcoded training MB encoded in the second format; and
   (c14) a conversion table generator module generating the block mode conversion table containing multi-tuples, each multi-tuple having a first tuple, a second tuple, and a third tuple, each said first tuple including a first training block mode for a sub-set of the training MBs encoded using the first training block mode, each said second tuple including a class identifier for the training MBs, identifying those MBs in the sub-set, whose residual information satisfies a predetermined set of constraints, and each said third tuple including a list of second training block modes used by the codec device in transcoding those training macroblocks in the sub-set that have the class identifier indicated in the corresponding said second tuple.

15. The system of claim 14, wherein the input MBs, output MBs, training MBs, and the transcoded training MBs have one or more partitions and the transcoding block mode, the first training block mode and the second training block mode indicate size of partitions within the output MB, the training MB and the transcoded training MB respectively.

16. The system of claim 14, wherein the list in the block mode conversion table generated by the conversion table generator module (c14) includes those second training block modes whose frequency of usage is above a predetermined usage threshold.

17. The system of claim 14, wherein the conversion table generator module (c14) comprises:
(a17) a record generator module generating a record for each training MB, the record including the first training block mode, the second training block mode, and the class identifier; and
(b17) a record processor module processing records for the training MBs for generating the block mode conversion table.

18. The system of claim 17, wherein the record processor module (b17) comprises:
(a18) a group handler module arranging the records into groups each group characterized by a unique combination of the first training block mode and the class identifier, and for each group recording a set of the second training block modes used by the codec device for transcoding the training MBs in the group;
(b18) a table maker module processing the groups to generate the multi-tuples in the block mode conversion table; and
(c18) a table storage module storing the block mode conversion table.

19. The system of claim 18, wherein the table maker module (b18) comprises:
(a19) computational means for creating a multi-tuple for each group in the block mode conversion table; and
(b19) computational means for storing the first training block mode and the class identifier characterizing said each group in said first tuple and said second tuple respectively and the set of the second training block modes for the group in said third tuple.

20. The system of claim 19, wherein the set of the second training block modes includes those second training block modes whose frequency of usage is above a predetermined usage threshold.

21. The system of claim 20, wherein the codec device (b14) further comprises computational means for extracting a motion vector (MV) for the training MB and generating a motion vector for the transcoded training MB.

22. The system of claim 21, wherein the record processor module (b17) further comprises computational means for computing a residual energy for the training MB.

23. The system of claim 22, wherein the pre-determined set of constraints includes constraints on a difference between the MV for the training image and a predicted MV for the transcoded training image.

24. The system of claim 23, wherein the pre-determined set of constraints further comprises a constraint on the residual energy for the training MB.

25. The system of claim 14, wherein the first format is one of H.263, H.264, MPEG-2 and MPEG-4, and the second format is one of H.263, H.264, MPEG-2 and MPEG-4.

26. The system of claim 14, wherein the sequence of input images is an input video and the sequence of output images is an output video.

27. A non-transitory computer readable storage medium, having a computer readable program code instructions stored thereon for execution by a processor, causing the processor to:
(a1) retrieve training images, each training image comprising one or more training macroblocks of pixels encoded in the first format:
(b1) transcode each training macroblock (MB) into a transcoded training MB encoded in the second format by using a codec device: and
(c1) generate the block mode conversion table containing multi-tuples, each multi-tuple having a first tuple, a second tuple, and a third tuple, each said first tuple including a, first training block mode for a sub-set of the training MBs encoded using the first training block mode, each said second tuple including a class identifier for the training MBs, identifying those MBs in the sub-set, whose residual information satisfies a predetermined set of constraints, and each said third tuple including a list of second training block modes used by the codec device in transcoding those training macroblocks in the sub-set that have the class identifier indicated in the corresponding said second tuple.

* * * * *